US006654544B1

(12) United States Patent
Suzuki et al.

(10) Patent No.: US 6,654,544 B1
(45) Date of Patent: Nov. 25, 2003

(54) VIDEO DATA RECORDING APPARATUS, VIDEO DATA RECORDING METHOD, VIDEO DATA REPRODUCING APPARATUS, VIDEO DATA REPRODUCING METHOD, VIDEO DATA RECORDING AND REPRODUCING APPARATUS, AND VIDEO DATA RECORDING AND REPRODUCTION METHOD

(75) Inventors: Takao Suzuki, Kanagawa (JP); Haruo Togashi, Kanagawa (JP); Satoshi Miyazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/436,308

(22) Filed: Nov. 8, 1999

(30) Foreign Application Priority Data

Nov. 9, 1998 (JP) .......................................... 10-317596

(51) Int. Cl.$^7$ .......................... H04N 5/917; H04N 7/26
(52) U.S. Cl. ...................... 386/112; 386/124; 386/131; 375/240.25
(58) Field of Search ........................... 386/46, 95, 109, 386/111, 124, 113, 125–126, 131, 112; 375/240.03, 240.25; H04N 5/917, 7/26

(56) References Cited

U.S. PATENT DOCUMENTS

| 5,511,054 A | * 4/1996 | Oishi et al. ................. 386/126 |
| 5,796,435 A | * 8/1998 | Nonomura et al. ..... 375/240.03 |
| 5,832,085 A | * 11/1998 | Inoue et al. ................. 386/131 |
| 6,081,300 A | * 6/2000 | Beyers, Jr. et al. ......... 348/589 |
| 6,198,848 B1 | * 3/2001 | Honma et al. ............... 382/232 |
| 6,330,365 B1 | * 12/2001 | Yasuda et al. ......... 375/240.27 |
| 6,397,000 B1 | * 5/2002 | Hatanaka et al. ........... 386/111 |

FOREIGN PATENT DOCUMENTS

| EP | 0 712 247 | 5/1996 |
| EP | 0 876 062 | 11/1998 |
| GB | 2 324 432 | 10/1998 |

* cited by examiner

Primary Examiner—Vincent Boccio
(74) Attorney, Agent, or Firm—Frommer Lawrence & Haug LLP; William S. Frommer; Darren M. Simon

(57) ABSTRACT

The present invention is a video data recording apparatus, a video data recording method, a video data reproducing apparatus, a video data reproducing method, a video data recording and reproducing apparatus, and a video data recording and reproducing method that can be interfaced using an MPEG2 elementary stream and that allow an input elementary stream to be recorded to a record medium and reproduced therefrom.

According to the present invention, a recording side stream converting means is disposed. The recording side stream converting means converts an input elementary stream into a device stream that is a stream suitable for a record medium. A recording means performs a recording process for the converted device stream and records the record data to the record medium.

A reproducing means reproduces record data recorded on the record medium as a device stream. According to the present invention, a reproducing side stream converting means is disposed. The reproducing side stream converting means converts the restored device stream into an elementary stream.

16 Claims, 25 Drawing Sheets

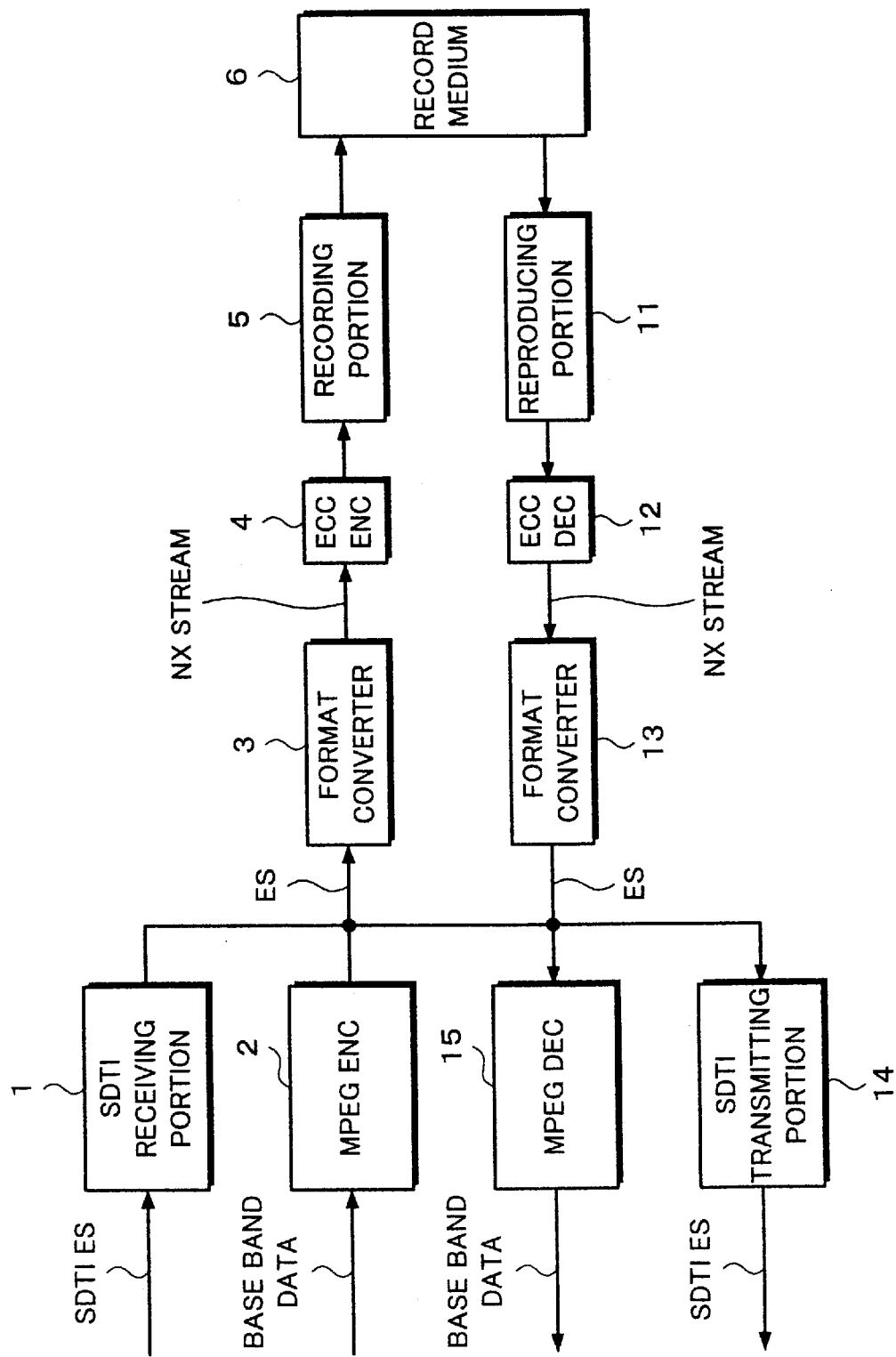

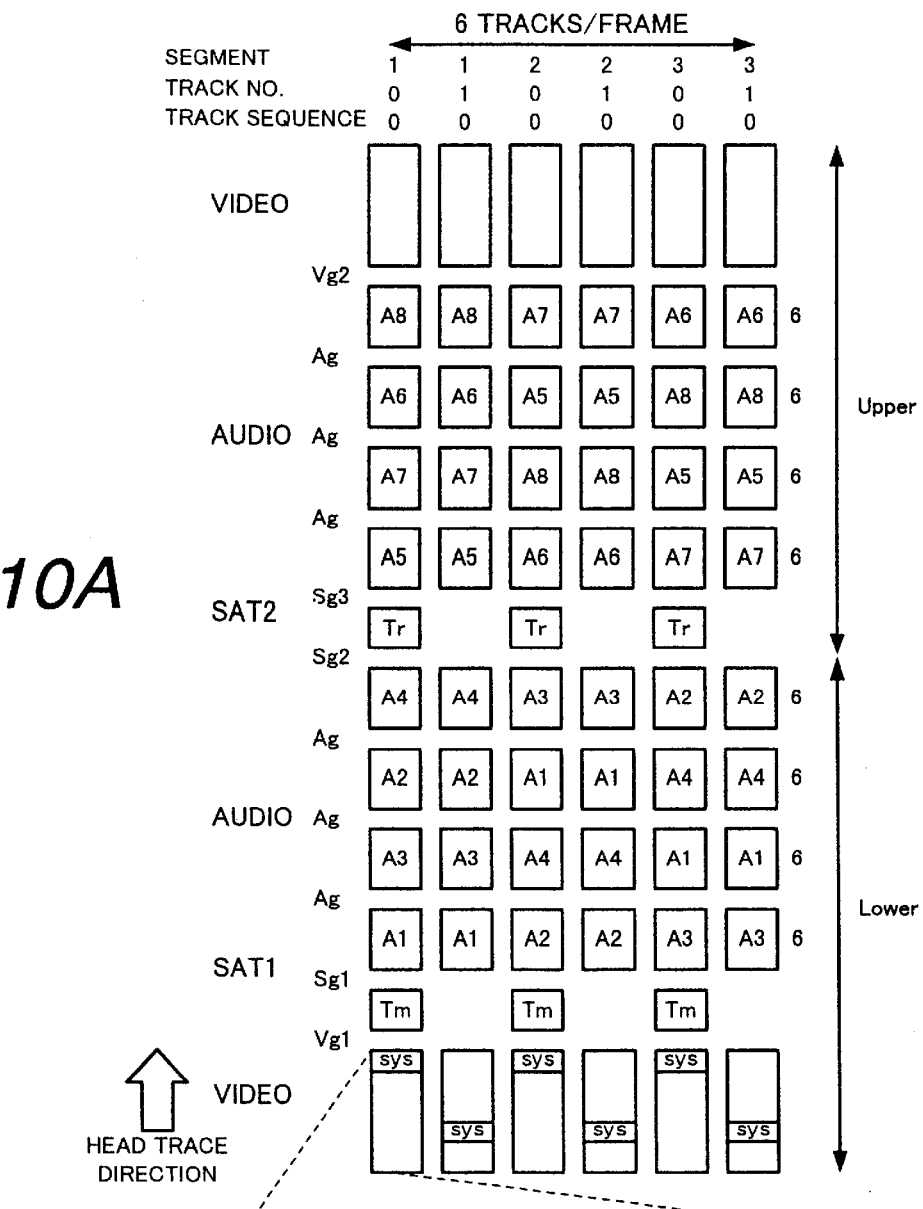
Fig. 10A
Fig. 10B
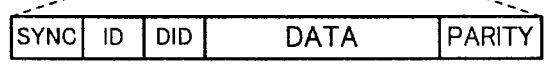
Fig. 10C

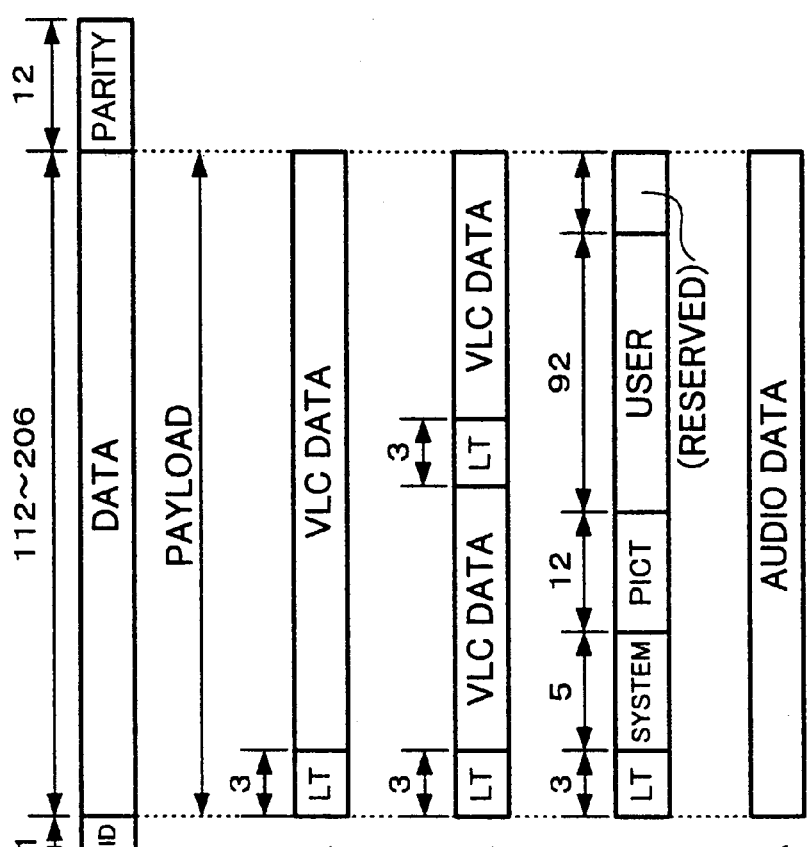

| MSB | ID0 | ID1 |
|---|---|---|
| 7 | SYNC ID7 | Upper/Lower |
| 6 | SYNC ID6 | (Reserved) |
| 5 | SYNC ID5 | SEG NB3 |
| 4 | SYNC ID4 | SEG NB2 |
| 3 | SYNC ID3 | SEG NB1 |
| 2 | SYNC ID2 | SEG NB0 |
| 1 | SYNC ID1 | TRACK |
| 0 | SYNC ID0 | VIDEO/AUDIO |

LSB

| DID(VIDEO) |
|---|
| (Reserved) |
| (Reserved) |
| (Reserved) |
| (Reserved) |
| PAYLOAD MD1 |
| PAYLOAD MD0 |
| 2MB/IMB |
| Vouter |

| DID(AUDIO) |
|---|
| (Reserved) |
| (Reserved) |
| (Reserved) |
| (Reserved) |
| DATA/AUDIO |
| 5F Seg2 |
| 5F Seg1 |
| 5F Seg0 |

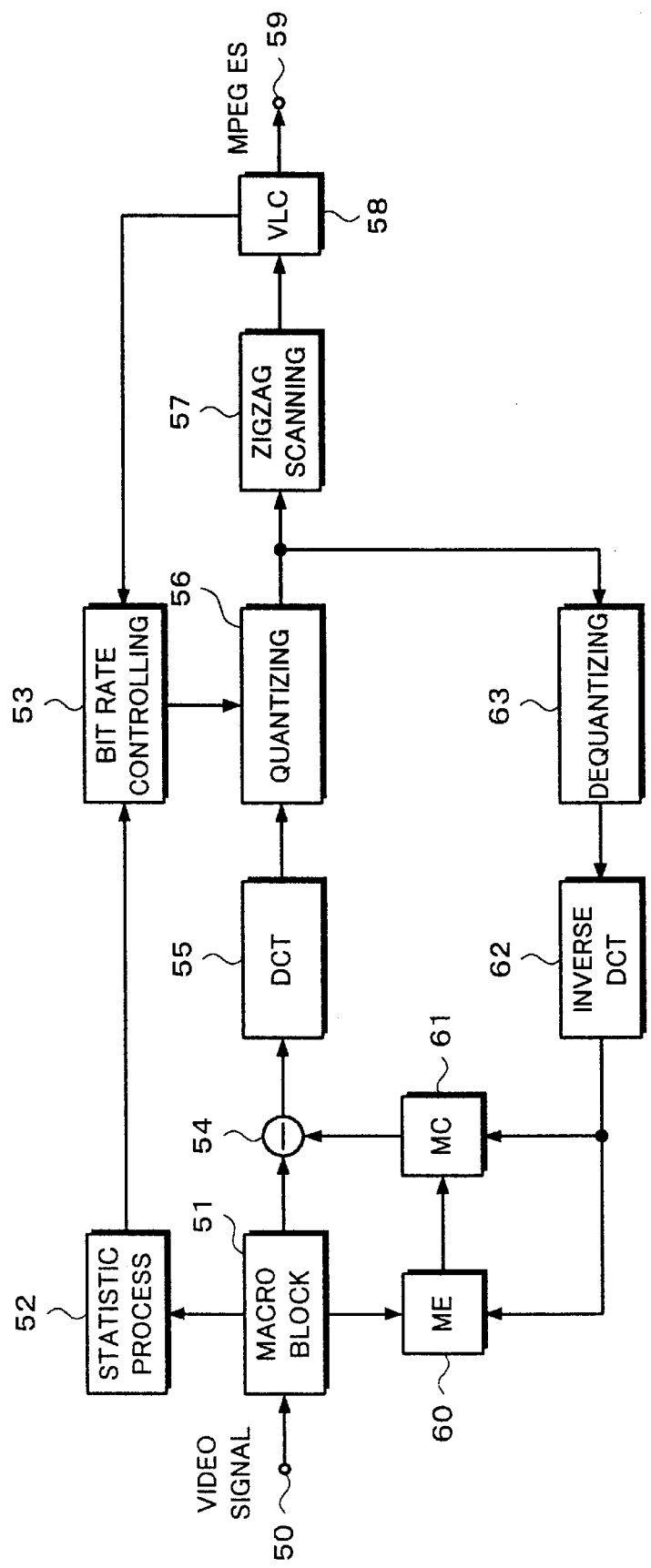

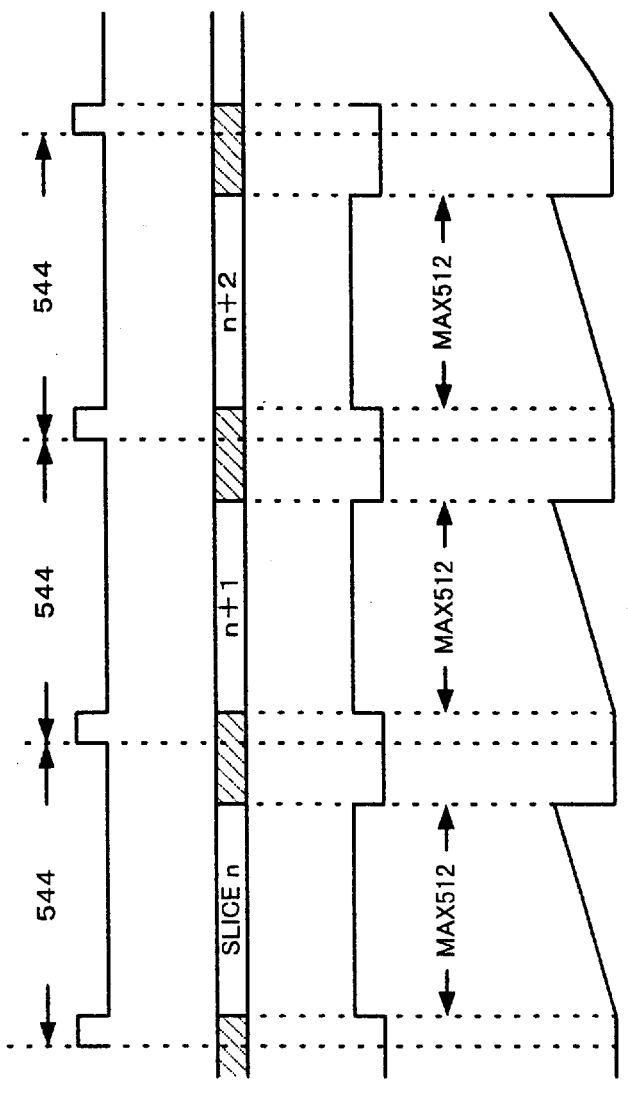
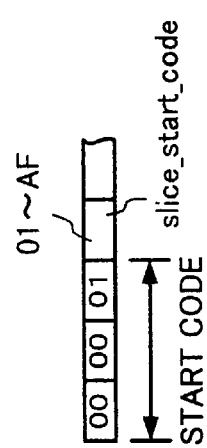

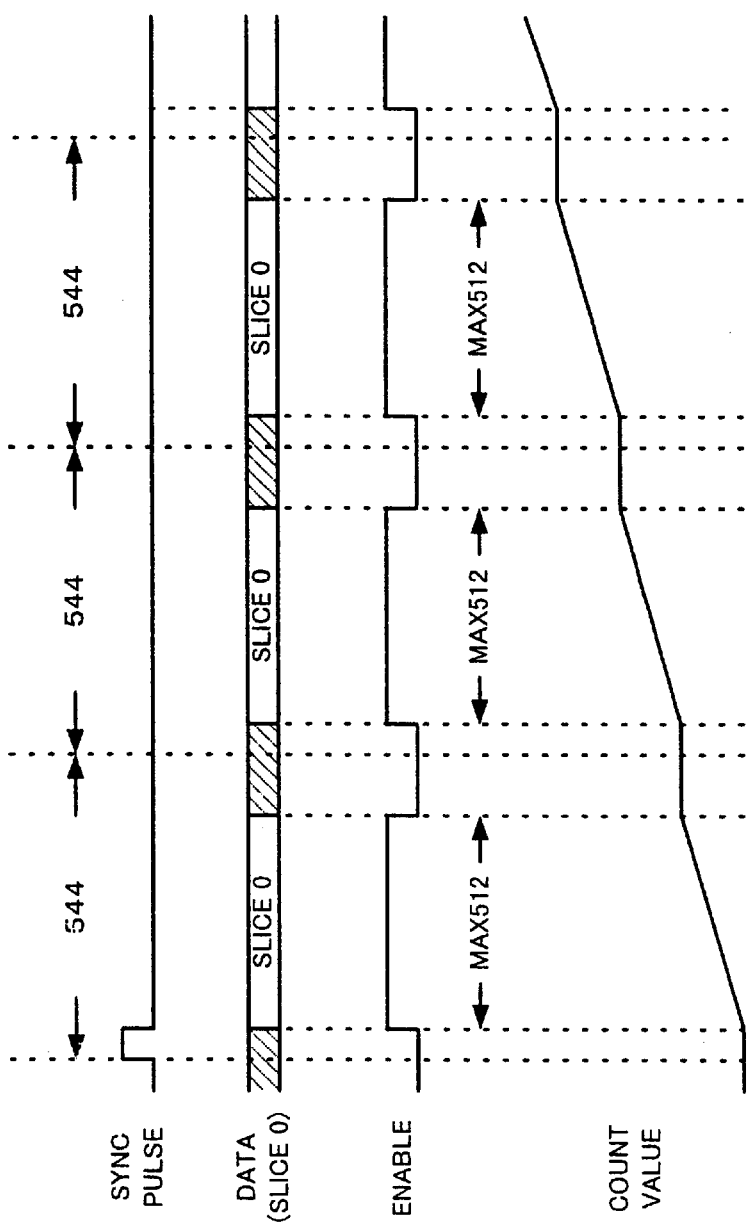
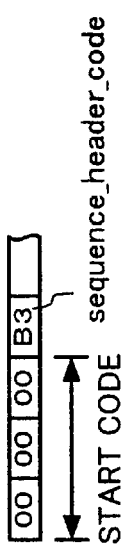

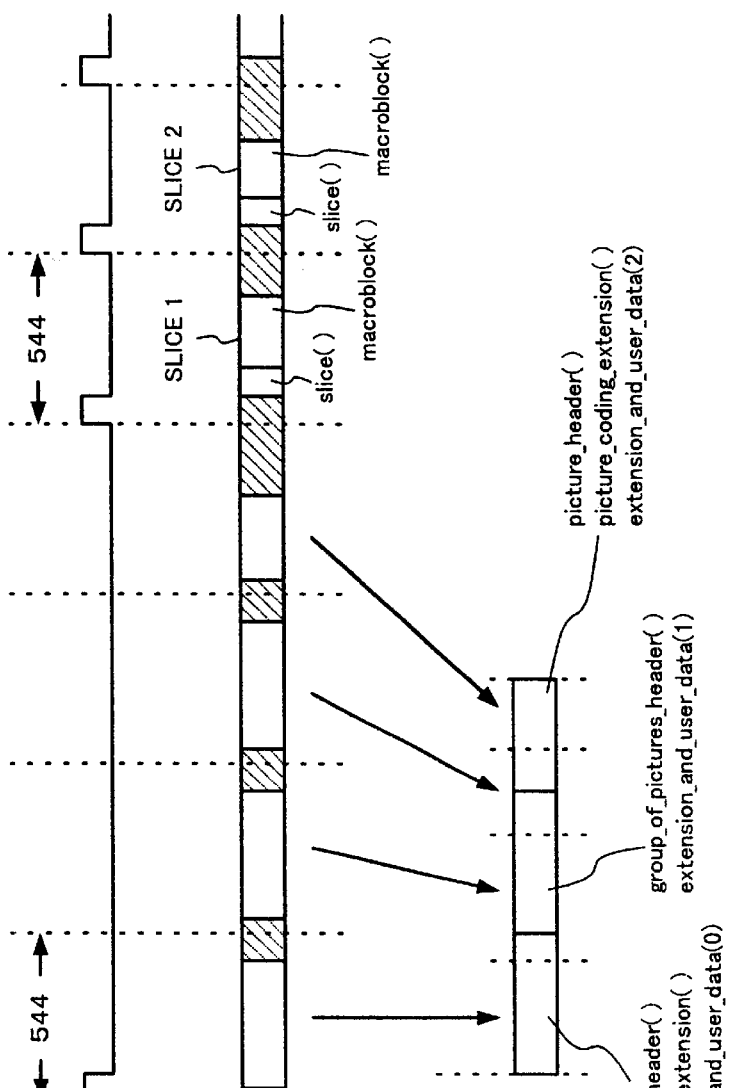

Fig. 23

| name | start code value (hexadecimal) |
|---|---|
| picture_start_code | 00 |
| slice_start_code | 01 through AF |
| reserved | B0 |
| reserved | B1 |
| user_data_start_code | B2 |
| sequence_header_code | B3 |
| sequence_error_code | B4 |
| extension_start_sode | B5 |
| reserved | B6 |
| sequence_end_code | B7 |
| group_start_code | B8 |
| system start codes(see note) | B9 through FF |
| NOTE—system start codes are defined in Part 1 of specification | |

*Fig. 24*

Video Squence

| video_sequence() { | No. of bits |
|---|---|
| next_start_code() | |
| sequence_header() | |
| if (nextbits() == extension_start_code) { | |
| sequence_extension() | |
| do { | |
| extension_and_user_data(0) | |
| do { | |
| if (nextbits() == group_start_code() { | |
| group_of_pictures_header() | |
| extension_and_user_data(1) | |
| } | |
| picture_header() | |
| picture_coding_extension() | |
| extension_and_user_data(2) | |
| picture_data() | |
| } while ((nextbits() == picture_start_code || | |
| (nextbits_() == group_start_code)) | |
| if (nextbits() != sequence_end_code) { | |
| sequence_haeder() | |
| sequence_extension() | |
| } | |
| } while (nextbits() != sequence_end_code) | |
| } else { | |
| /* ISO/INC 1117-2 */ | |
| } | |
| sequence_end_code | 32 |
| } | |

Fig. 25

Sequence header

| sequence_header() { | No. of bits |
|---|---|
| sequence_header_code | 32 |
| horizontal_size_value | 12 |
| vartical_size_value | 12 |
| aspect_ratio_information | 4 |
| frame_rate_code | 4 |
| bit_rate_value | 18 |
| marker_bit | 1 |
| vbv_buffer_size_value | 10 |
| constrained_parameters_flag | 1 |
| load_intra_quantiser_matrix | 1 |
| if (load_intra_quantiser_matrix) | |
| intra_quantiser_matrix[64] | 8*64 |
| load_non_intra_quantiser_matrix | 1 |
| if (load_non_intra_quantiser_matrix) | |
| non_intra_quantiser_matrix[64] | 8*64 |
| next_start_code() | |
| } | |

Fig. 26

Group of pictures header

| group_of_picture_header() { | No. of bits |
|---|---|
| group_start_code | 32 |
| time_code | 25 |
| closed_gop | 1 |
| broken_link | 1 |
| next_start_code() | |
| } | |

Fig. 27

Picture header

| picture_header() { | No. of bits |
|---|---|
| picture_start_code | 32 |
| temporal_reference | 10 |
| picture_coding_type | 3 |
| vbv_delay | 16 |
| if (picture_coding_type == 2 \|\| picture_coding_type == 3) { | |
|     full_pel_forward_vector | 1 |
|     forward_f_code | 3 |
| } | |
| if (picture_coding_type == 3) { | |
|     full_pel_backward_vector | 1 |
|     backward_f_code | 3 |
| } | |
| while (nextbits() == '1') { | |
|     extra_bit_picture   /* with the value "1" */ | 1 |
|     extra_information_picture | 8 |
| } | |
| extra_bit_picture   /* with the value "0" */ | 1 |
| next_start_code() | |
| } | |

VIDEO DATA RECORDING APPARATUS, VIDEO DATA RECORDING METHOD, VIDEO DATA REPRODUCING APPARATUS, VIDEO DATA REPRODUCING METHOD, VIDEO DATA RECORDING AND REPRODUCING APPARATUS, AND VIDEO DATA RECORDING AND REPRODUCTION METHOD

BACKGROUND OF THE INVENTION

1. Field of the Invention

The present invention relates to a video data recording apparatus, a video data recording method, a video data reproducing apparatus, a video data reproducing method, a video data recording and reproducing apparatus, and video data recording and reproducing method applicable for video data corresponding to for example MPEG2 (Moving Picture Experts Group Phase 2) standard.

2. Description of the Related Art

As exemplified with a digital VCR (Video Cassette Recorder), a data recording and reproducing apparatus that records a digital video signal to a record medium and that reproduces the digital video signal therefrom is known. Since the information amount of the digital video signal is large, it is compressed. As an example of an encoding process for compressing the data amount of moving picture data, inter frame motion compensation predictive encoding process is known. As such an encoding standard, the MPEG2 standard is known.

When picture data corresponding to the MPEG2 standard is recorded and reproduced, all an elementary stream (ES), a packetized elementary stream (PES), and a transport stream (TS) can be recorded and reproduced. The ES is a bit stream that an encoder outputs and that is composed of access units corresponding to video frames. The PES is a packetized ES. Each packet has a PES header. The TS is segmented with packets whose length is 188 bytes each. Data of the PES is divided into packets. Each packet contains a TS header.

MPEG data has a hierarchical structure. The highest layer of the hierarchy is a sequence layer. The sequence layer is followed by a GOP (Group Of Picture) layer, a picture layer, a slice layer, a macro block layer, and a block area. In the MPEG standard, data contained in each layer is defined. The block layer that is the lowest layer contains DCT coefficient data generated corresponding to the DCT (Discrete Cosine Transform) process. One macro block is composed of four blocks of a luminance signal and one or two blocks of a color difference signal. Thus, one macro block contains a total of six blocks or eight blocks of coefficient data. The coefficient data is encoded with a variable length code. Macro block mode data that represents a macro block type is added to a macro block that has been encoded with the variable length code.

When PEG data is recorded or reproduced by a digital VCR in the environment of a broadcasting station, it is advantageous to record and reproduce an ES rather than a TS because the delay becomes the minimum and the switching timing becomes clear. These features are very important for a VCR used in a broadcasting station. As an interface for an ES in the MPEG standard, SDTI-CP (Serial Data Transform Interface Content Package) interface can be used. There are following differences between an ES in the SDTI-CP format and a TS in the MPEG format.

In the SDTI-CP format:
Clock synchronization: H/V synchronous signal of SDI
Frame synchronization: Frame synchronous signal of SDI
Decode delay: one frame (two frames for END and DEC)
In the MPEG-TS format:
Clock synchronization: PCR
Frame synchronization: PTS/DTS of PES
Decode delay: Several frames (depending on vbv delay)

As is clear from the comparison, it is advantageous to use an TS in the case that a synchronous signal cannot be transmitted between two far points by another means. However, in a broadcasting station, all operations are performed using a single synchronous signal named house sync. Thus, a synchronous signal can be easily obtained. Consequently, it is not necessary to place a synchronous signal PCR (Program Clock Reference) on a stream. This applies to frame synchronization. A time reference termed time code is totally used in the broadcasting station. Thus, new time stamps such as PTS (Program Time Stamp) and DTS (Decoding Time Stamp) of a PES are not required.

More importantly, a transmission system that performs encoding/decoding processes with a small delay is required. In the case of the MPEG-TS, a vbv buffer (that the encoder estimates as the storage capacity of a buffer on a decoder side) is used to smooth the transmission rate. When the size of the buffer is large, the delay of the decoder becomes large.

On the other hand, in the SDTI-CP, with a sufficient transmission band, a stream (video data, audio data, additional data, and so forth) of one frame can be transmitted as bursts. Thus, since the frame is immediately preceded by a synchronous signal thereof, a switching operation can be performed on a transmission path for video data, audio data, additional data, and so forth. In addition, unlike with the MPEG-TS, it is not necessary to take a time for storing data to the vbv buffer. Thus, in the next frame, data can be decoded. Because of such a reason, it is preferred that a digital VCR used in a broadcasting station can input an ES, record it on a tape, and output data reproduced from a tape as an ES.

When an ES is recorded and reproduced by a VCR, because of the characteristics thereof, with the syntax of the MPEG standard, a problem takes place. In the MPEG2 standard, a variable length code is used. As a data synchronization detecting system for data, (1) preceded by (0) of 23 bits is used as a start code. The minimum unit of the lowest hierarchical layer is a slice. Normally, one slice is composed of one stripe (16 lines). With one stripe, a variable length code starts with the left edge of the screen and ends with the left edge thereof.

When an MPEG ES of which one slice is composed of one stripe is recorded on a tape by a VCR, the resistance against an error is weak. Even if one error takes place in the slice, the error propagates to the right edge of the screen. The error cannot be restored until the next slice header is detected. When a variable speed reproducing operation of which part of data is reproduced is performed, only a portion followed by a variable length code is reproduced. Thus, a reproduced portion concentrates at the left side of the screen. Consequently, the screen cannot be equally updated. In addition, when a high speed reproducing operation is performed, the arrangement of data on the tape cannot be predicted. Thus, when a tape pattern is traced at predetermined intervals, the screen cannot be equally updated.

Moreover, in the MPEG syntax, the maximum slice length (maximum macro block length) is not limited. Thus, data whose data amount becomes larger than the original video data is permitted. In this case, it takes a long time to perform a process for rearranging coefficients every macro block. Thus, since a buffer is required, a system delay becomes large.

In association with the rearranging process for coefficients every macro block, a packing process will be described. In a VCR, to simplify signal processes for the recording operation and the reproducing operation, a synchronous signal and an ID are added to data with a predetermined length so as to form sync blocks. A process for packing data in the data area of a sync block is referred to as packing process. The packing process is performed on the recording side. In contrast, a process for removing data from the data area of a sync block is referred to as depacking process. The depacking process is performed on the reproducing side. When a product code is used, data is packed in one line of an ECC (Error Correcting Code) block of the product code.

In a VCR, the amount of data that can be recorded every track or every a predetermined number of tracks is fixed. Thus, the data amount of a variable length code generated in a predetermined time period is controlled so that it does not exceed a predetermined value. Data encoded with a variable length code is packed in data areas of a plurality of sync blocks in a predetermined time period.

When variable length data of each macro block is packed, fixed portions (equivalent to data areas for sync blocks) corresponding to the number of macro blocks in a predetermined time period (for one frame as an edit unit) of which the data amount is selected are prepared. One variable length data portion is packed to one fixed portion. All macro blocks are packed from the beginning of each of the fixed portions. An overflow portion that cannot be packed to a fixed portion is successively packed to a blank area of other fixed portions. In this case, length information that represents the data length of variable length data of each macro block is added to the variable length data. When data is reproduced, with reference to the length information, variable length data is depacked.

When variable length data of a macro block is 4:2:2 video data, every eight DCT blocks, the variable length data is zigzag scanned in the order from DC coefficients (DC components) to AC coefficients (AC components). DC coefficients and low frequency AC coefficients of individual DC blocks disperse in variable length data of one macro block (one slice). To decode DCT blocks and restore a picture, these components are important elements. However, as mentioned above, due to an error that takes place in the reproducing operation of the VCR, DCT blocks may not be decoded in the middle of variable length data. Moreover, in the variable speed reproducing operation of the VCR, since data is partly reproduced, the depacking process cannot be performed. Thus, in consideration of an error propagation and a process in the variable speed reproducing operation, it is not preferred that DC coefficients and low frequency AC coefficients disperse.

In the MPEG standard, video data has a hierarchical structure of six layers that are a sequence layer, a GOP layer, a picture layer, a slice layer, a macro block layer, and a block layer. In addition, a multiplexing process is performed in each hierarchical level. The multiplexing process is defined as a syntax of the MPEG standard. Other than picture data, header information such as a PES (Packetized Elementary Stream) header, a sequence header, a GOP header, and a slice header is multiplexed. The header information is important for performing a process such as a decoding process for picture data. When an ES of the MPEG standard is recorded and reproduced, in addition to picture data, it is necessary to record and reproduce the header information, respectively. As one method for recording and reproducing the header information, the minimum data that is sufficient and necessity for reproducing header information is recorded and reproduced, respectively.

However, sometimes, it may be difficult to treat the data amount of the header information as fixed length data. Firstly, there are many types of video data formats and the data amount of header information varies in each format. For example, there are 18 video formats in America digital television broadcasts. Secondly, video index data and ancillary data multiplexed on a particular line (the ancillary data are for example a closed caption, a teletext, and a time code of vertical blanking interval (VITC)) are transmitted as a video ES. Thus, when they are inserted into a user data area of a picture header, the data amount of the user data area fluctuates.

Thus, to record variable length data that is not video data (such as header information, a video index, and ancillary data), a record area should be assigned considering a relevant record picture format. In addition, it is necessary to allocate a record area that can record the maximum amount of data that will take place.

When the number of video formats is only one or two, since the variation of the data amount is relatively small, it is not difficult to allocate record areas for non-video data on a tape corresponding to the individual video formats. However, when there are many video formats, since the variation of the data amount of non-video data may become large or may not be predictable, it is difficult to allocate record areas for non-video data on a tape. In contrast, when record areas that can record the maximum amount of data that may take place are allocated, if the data amount is small, a loss area takes place on the tape. Thus, the record storage amount of the tape cannot be effectively used.

In a digital VCR that can record and reproduce an MPEG ES, it is necessary to convert the ES into a stream suitable for the VCR (this stream is referred to as device stream). In other words, a slice structure of which one slice is equal to one macro block should be used. In addition, variable length data should be rearranged so that DC coefficients and AC coefficients are successively arranged in the order of DC coefficients and lower AC coefficients. Thus, an influence of an error can be suppressed. In addition, the picture quality in the variable speed reproducing operation can be improved. However, non-video data that is variable length data with a relatively large data amount should be recorded and/or reproduced.

OBJECTS AND SUMMARY OF THE INVENTION

Thus, an object of the present invention is to provide a video data recording apparatus, a video data recording method, a video data reproducing apparatus, a video data reproducing method, a video data recording and reproducing apparatus, and a video data recording and reproducing method that allow data as an ES to be interfaced outside the apparatus and the ES to be converted into a device stream suitable for a process of a VCR.

A first aspect of the present invention is a video data recording apparatus for recording video data to a record medium, comprising a receiving means for receiving an elementary stream from the outside of the apparatus, the elementary stream having a hierarchical structure of a block layer, a macro block layer, a slice layer, a picture layer, a GOP layer, and a sequence layer, the block layer being composed of variable length data of which one screen of video data is divided into a plurality of blocks, data of each block is orthogonally transformed and thereby coefficient data is generated, the coefficient data being encoded with a variable length code, the macro block layer being composed of a plurality of blocks that are spatially adjacent, the slice layer being composed of at least one macro block, the picture layer being composed of at least one slice, the GOP layer being composed of at least one picture, the sequence layer being composed of at least one GOP, a recording side stream converting means for converting the elementary stream that is output from the receiving means into a device stream that is a data stream suitable for the record medium, a record processing means for performing a process for recording the device stream to the record medium and forming record data, and a recording means for recording the record data received from the record processing means to the record medium.

Thus, an elementary stream having a hierarchical structure is converted into a device stream suitable for a record medium. The device stream is recorded to the record medium.

A second aspect of the present invention is a video data reproducing apparatus for reproducing video data from a record medium, record data being recorded on the record medium in such a manner that an elementary stream is converted into a device stream that is a data stream suitable for the record medium, the elementary stream having a hierarchical structure of a block layer, a macro block layer, a slice layer, a picture layer, a GOP layer, and a sequence layer, the block layer being composed of variable length data of which one screen of video data is divided into a plurality of blocks, data of each block is orthogonally transformed and thereby coefficient data is generated, the coefficient data being encoded with a variable length code, the macro block layer being composed of a plurality of blocks that are spatially adjacent, the slice layer being composed of at least one macro block, the picture layer being composed of at least one slice, the GOP layer being composed of at least one picture, the sequence layer being composed of at least one GOP, the apparatus comprising a reproducing means for reproducing the record data from the record medium, a reproduction processing means for processing the record data that is output from the reproducing means and restoring the device stream, a reproducing side stream converting means for converting the restored device stream into the elementary stream, and a transmitting means for outputting the elementary stream that is output from the reproducing side stream converting means to the outside of the apparatus.

Thus, an elementary stream having a hierarchical structure is reproduced from a record medium on which a device stream converted from the elementary stream has been recorded.

A third aspect of the present invention is a video data recording and reproducing apparatus for recording video data to a record medium and reproducing video data from the record medium, comprising a receiving means for receiving an elementary stream from the outside of the apparatus, the elementary stream having a hierarchical structure of a block layer, a macro block layer, a slice layer, a picture layer, a GOP layer, and a sequence layer, the block layer being composed of variable length data of which one screen of video data is divided into a plurality of blocks, data of each block is orthogonally transformed and thereby coefficient data is generated, the coefficient data being encoded with a variable length code, the macro block layer being composed of a plurality of blocks that are spatially adjacent, the slice layer being composed of at least one macro block, the picture layer being composed of at least one slice, the GOP layer being composed of at least one picture, the sequence layer being composed of at least one GOP, a recording side stream converting means for converting the elementary stream that is output from the receiving means into a device stream that is a data stream suitable for the record medium, a record processing means for performing a process for recording the device stream to the record medium and forming record data, a recording means for recording the record data received from the record processing means to the record medium, reproducing means for reproducing the record data from the record medium, a reproduction processing means for processing the record data that is output from the reproducing means and restoring the device stream, a reproducing side stream converting means for converting the restored device stream to the elementary stream, and a transmitting means for outputting the elementary stream that is output from the reproducing side stream converting means to the outside of the apparatus.

Thus, an elementary stream having a hierarchical structure is converted into a device stream suitable for a record medium. The device stream is recorded to the record medium. In addition, the elementary stream is reproduced from the record medium.

A fourth aspect of the present invention is a video data recording method for recording video data to a record medium, comprising the steps of (a) receiving an elementary stream from the outside, the elementary stream having a hierarchical structure of a block layer, a macro block layer, a slice layer, a picture layer, a GOP layer, and a sequence layer, the block layer being composed of variable length data of which one screen of video data is divided into a plurality of blocks, data of each block is orthogonally transformed and thereby coefficient data is generated, the coefficient data being encoded with a variable length code, the macro block layer being composed of a plurality of blocks that are spatially adjacent, the slice layer being composed of at least one macro block, the picture layer being composed of at least one slice, the GOP layer being composed of at least one picture, the sequence layer being composed of at least one GOP, (b) converting the elementary stream obtained at step (a) into a device stream that is a data stream suitable for the record medium, (c) performing a process for recording the device stream to the record medium and forming record data, and (d) recording the record obtained at step (c) to the record medium.

Thus, an elementary stream having a hierarchical structure is converted into a device stream suitable for a record medium. The device stream is recorded to the record medium.

A fifth aspect of the present invention is a video data reproducing method for reproducing video data from a record medium, record data being recorded on the record medium in such a manner that an elementary stream is converted into a device stream that is a data stream suitable for the record medium, the elementary stream having a hierarchical structure of a block layer, a macro block layer, a slice layer, a picture layer, a GOP layer, and a sequence layer, the block layer being composed of variable length data of which one screen of video data is divided into a plurality of blocks, data of each block is orthogonally transformed and thereby coefficient data is generated, the coefficient data being encoded with a variable length code, the macro block layer being composed of a plurality of blocks that are spatially adjacent, the slice layer being composed of at least one macro block, the picture layer being composed of at least one slice, the GOP layer being composed of at least one picture, the sequence layer being composed of at least one GOP, the method comprising the steps of (a) reproducing the record data from the record medium, (b) processing the record data obtained at step (a) and restoring the device stream, (c) converting the restored device stream into the elementary stream, and (d) outputting the elementary stream obtained at step (c) to the outside.

Thus, an elementary stream having a hierarchical structure is reproduced from a record medium on which a device stream converted from the elementary stream has been recorded.

A sixth aspect of the present invention is a video data recording and reproducing method for recording video data to a record medium and reproducing video data from the record medium, comprising the steps of (a) receiving an elementary stream from the outside, the elementary stream having a hierarchical structure of a block layer, a macro block layer, a slice layer, a picture layer, a GOP layer, and a sequence layer, the block layer being composed of variable length data of which one screen of video data is divided into a plurality of blocks, data of each block is orthogonally transformed and thereby coefficient data is generated, the coefficient data being encoded with a variable length code, the macro block layer being composed of a plurality of blocks that are spatially adjacent, the slice layer being composed of at least one macro block, the picture layer being composed of at least one slice, the GOP layer being composed of at least one picture, the sequence layer being composed of at least one GOP, (b) converting the elementary stream obtained at step (a) into a device stream that is a data stream suitable for the record medium, (c) performing a process for recording the device stream to the record medium and forming record data, (d) recording the record data obtained at step (c) to the record medium, (e) reproducing the record data from the record medium, (f) processing the record data obtained at step (e) and restoring the device stream, (g) converting the restored device stream to the elementary stream, and (h) outputting the elementary stream obtained at step (g) to the outside.

Thus, an elementary stream having a hierarchical structure is converted into a device stream suitable for a record medium. The device stream is recorded to the record medium. In addition, the elementary stream is reproduced from the record medium.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a block diagram showing an outlined structure of the present invention;

FIGS. 10A, 10B, and 10C are schematic diagrams showing another example of the track format;

FIGS. 11A, 11B, 11C, 11D, and 11E are schematic diagrams showing a plurality of examples of the structures of sync blocks;

FIGS. 12A, 12B, and 12C are schematic diagrams showing the contents of an ID and a DID added to sync blocks;

FIG. 13 is a block diagram showing an example of the structure of a video encoder according to the present invention;

FIGS. 20A, 20B, 20C, 20D, and 20E are timing charts for explaining a transmitting method of video data;

FIGS. 21A, 21B, 21C, 21D, and 21E are timing charts for explaining a transmitting method of non-video data;

FIGS. 22A, 22B, and 22C are timing charts for explaining a transmitting method of a stream;

FIG. 23 is a table showing a definition of a start code value in the MPEG syntax;

FIG. 24 is a table for explaining the MPEG syntax;

FIG. 25 is a table for explaining the MPEG syntax;

FIG. 26 is a table for explaining the MPEG syntax; and

FIG. 27 is a table for explaining the MPEG syntax.

DETAILED DESCRIPTION OF THE PREFERRED EMBODIMENTS

Figure 2A:
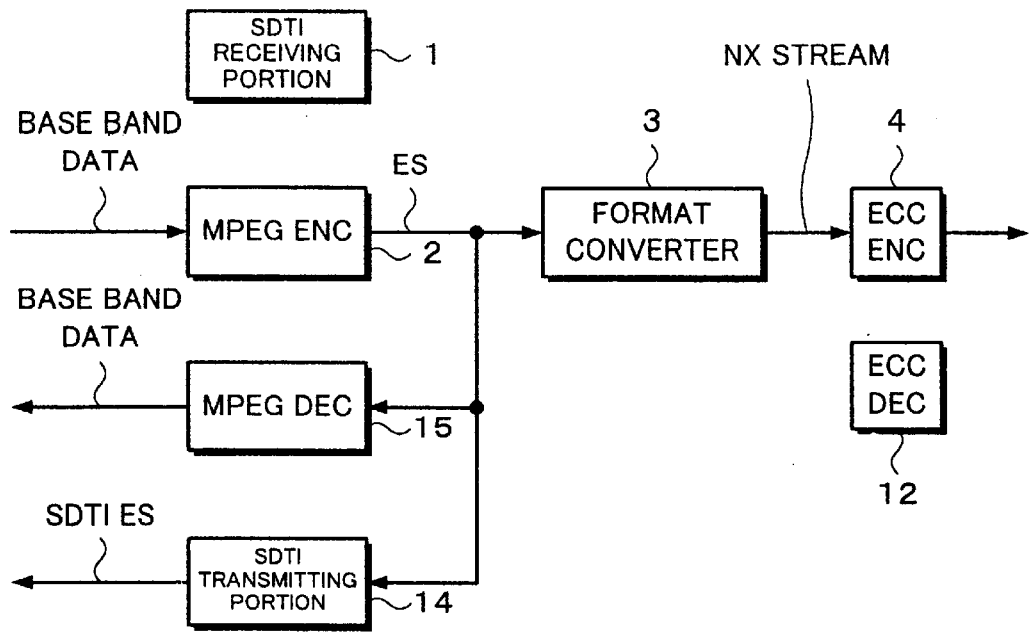
FIGS. 2A and 2B are block diagrams showing the structures of individual structural blocks in recording operations according to the present invention.

The digital VCR according to the embodiment is suitably used in the environment of a broadcasting station. The digital VCR can record and reproduce video signals in a plurality of formats. For example, the digital VCR can record and reproduce an NTSC interlace-scanned 480-line signal (hereinafter referred to as 480i signal) and a PAL interlace-scanned 576-line signal (hereinafter referred to as 576i signal) without need to change the hardware. In addition, the digital VCR can record and reproduce an interlace-scanned 1080-line signal (hereinafter referred to as 1080i signal), a progressive noninterlace-scanned 480-line signal (hereinafter referred to as 480p signal), a progressive noninterlace-scanned 720-line signal (hereinafter referred to as 720p signal), and a progressive noninterlace-scanned 1080-line signal (hereinafter referred to as 1080p signal).

According to the present invention, a video signal is compression-encoded correspoding to the MPEG2 standard. As well known, the MPEG2 standard is a combination of a motion compensation predictive encoding process and a DCT compression encoding process. The data structure of the MPEG2 standard is a hierarchical structure having a block layer (lowest layer), a macro block layer, a slice layer, a picture layer, a GOP (Group Of Picture) layer, and a sequence layer (highest layer).

The block layer is composed of DCT blocks.

The DCT process is performed for each DCT block. The macro block layer is composed of a plurality of DCT blocks. The slice layer is composed of a header portion and any number of macro blocks that are placed on one line, not on two lines. The picture layer is composed of a header portion and a plurality of slices. One picture is equivalent to one screen. The GOP layer is composed of a header portion, an I picture (as an intra-frame coded picture), a P picture (as a predictively coded picture), and a B picture (as a bidirectionally predictively coded picture).

When an I picture is encoded, only the information thereof is used. Thus, the I picture is decoded with the information thereof. A P picture uses an I picture or a P picture that has been decoded as a predictive picture that is a reference picture for obtaining the difference. The difference between the P picture and the motion-compensated predictive picture is encoded. Alternatively, the P picture is encoded. One of these methods is selected whichever effective for each macro block. A B picture uses three types of pictures as predictive pictures that are an I picture or a P picture that has been decoded before the B picture, an I picture or a P picture that has been decoded after the B picture, and an interpolated picture created by these two pictures. The difference between the B picture and each of the three types of pictures that have been motion-compensated is encoded. Alternatively, the B picture is intra-encoded. One of these methods is selected whichever effective for each macro block.

Thus, there are four types of macro blocks that are an intra frame coded macro block, a forward inter frame predictive macro block (a future macro block is predicted with a past macro block), a backward inter frame predictive macro block (a past macro block is predicted with a future macro block), and a bidirectional macro block (the current macro block is predicted in both forward and backward directions). All macro blocks of an I picture are intra frame coded macro blocks. A P picture contains intra frame coded macro blocks and forward inter frame predictive macro blocks. A B picture contains all the four types of macro blocks.

In the MPEG syntax, each GOP contains at least one I picture. In other words, each GOP may not contain a P picture and/or a B picture. The sequence layer (which is the highest layer) is composed of a header portion and a plurality of GOPs.

In the MPEG format, a slice is one variable length code sequence. The variable length code sequence is a sequence of which the boundary of data cannot be detected unless a variable length code is decoded.

At the beginning of each of the sequence layer, the GOP layer, the picture layer, the slice layer, and the macro block layer, an identification code having a predetermined bit pattern as a byte is placed. The identification code is referred to as start code. The header portion of each layer contains a header, extension data, or user data. The header of the sequence layer contains the size of a picture (the number of pixels in the vertical direction and the horizontal direction). The header of the GOP layer contains a time code and the number of pictures of the current GOP.

Each of the macro blocks contained in the slice layer is a set of a plurality of DCT blocks. An encoded sequence of DCT blocks is composed in such a manner that a sequence of quantized DCT coefficients is encoded as sets of the number of 0 coefficients and a non-0 coefficient. An identification code arranged as a byte is not added to each macro block and each DCT block of each macro block.

A macro block is an element of which a picture is divided by 16 pixels×16 lines as a matrix. A slice is composed of macro blocks that are horizontally connected. The last macro block of the first slice of two successive slices and the top macro block of the second slice thereof are successive. Macro blocks that overlap between two successive slices are prohibited. The number of macro blocks depends on the size of a picture.

To prevent a signal from deteriorating in a decoding process or an encoding process, it is preferred that encoded data is edited. At this point, a P picture requires a picture that is chronologically preceded by the P picture. On the other hand, a B picture requires a picture that is chronologically preceded by the B picture and a picture that is chronologically followed by the B picture. Thus, data cannot be edited frame by frame. From this point of view, according to the embodiment of the present invention, one GOP is composed of one I picture.

A record area of record data for one frame is predetermined. In the MPEG2 standard, since a variable length code encoding process is used, the data amount for one frame is controlled so that data generated in one frame period is recorded in the predetermined record area.

According to the embodiment, one slice is composed of one macro block so that data can be properly recorded on a magnetic tape. In addition, one macro block is packed to a fixed portion with a predetermined length. In the MPEG standard, one slice is composed of one stripe (16 lines). Moreover, a variable length code starts with the left edge of the screen and ends with the right edge thereof. According to the embodiment, one slice is composed of one macro block so that the update ratio of the screen is improved in a variable speed reproducing operation.

Before explaining the embodiment in detail, with reference to FIG. 1, the outlined structure of the present invention will be described. For simplicity, in FIG. 1, audio data is omitted. Referring to FIG. 1, reference numeral 1 is an SDTI receiving portion. To transmit an MPEG ES, an SDTI-CP (Content Package) is used. Reference numeral 2 is an MPEG video encoder. An ES is supplied from the SDTI receiving portion 1 or a video encoder 2 to a format converter 3. The ES is an I picture stream composed of 4:2:2 components. In this example, one GOP is one picture.

The format converter 3 converts an ES into a device stream (referred to as NX stream) suitable for the recording operation of a digital VCR. The format converter 3 converts an ES so that the relation of one slice=one macro block is satisfied. In addition, the format converter 3 assembles non-video data as one slice (referred to as slice 0). Moreover, the format converter 3 limits the maximum length of one slice of video data (referred to as slice X) and the maximum length of one slice of slice 0. In addition, the format converter 3 rearranges coefficient data of DCTs. A sequence header, a GOP header, and a picture header of non-video data of slice 0 are added to each picture. The format converter 3 outputs an NX stream (having a data width of for example eight bits) at a fixed bit rate (for example, 27 Mbps, 50 Mbps, etc).

The NX stream is supplied to an ECC encoder 4. The ECC encoder 4 mainly performs a packing process for packing slice 0 and slice X frame by frame, an encoding process with an error correction code, and a data rearranging (shuffling) process. To do these processes, the ECC encoder 4 has a memory that has a large storage capacity and that operates at a high access speed.

Output data of the ECC encoder 4 is supplied to a recording portion 5. The recording portion 5 performs a sync/ID adding process, a scrambling process, a record encoding process (for example, partial response pre-coding process), and so forth. The ECC encoder 4 outputs resultant data to a rotating head through a recording amplifier. The rotating head records record data to a record medium (for example, a magnetic tape) 6.

A rotating head of a reproducing portion 11 reproduces data from the record medium 6. The reproducing portion 11 performs an amplifying process, a record decoding process, a descrambling process, a sync/ID extracting process, and so forth. Reproduction data is supplied from the reproducing portion 11 to an ECC decoder 12. The ECC decoder 12 performs inverse process of the ECC encoder 4. In other words, the ECC decoder 12 performs a deshuffling process, an error correcting process, a depacking process, and an error concealing process for concealing an error that cannot be corrected.

An NX stream is supplied from the ECC encoder 12 to a format converter 13. The format converter 13 converts the NX stream into an MPEG ES. The data processed by the recording side format converter 3 does not violate the MPEG syntax. In other words, one GOP is one picture. Data is composed of only I pictures. One slice is one macro block. However, the maximum slice length is limited. On the other hand, the reproducing side format converter 13 performs a multiplexing process for causing a header added to each picture to be multiplexed corresponding to the MPEG syntax and a process for causing the arrangement of coefficients to be restored to the original order.

The format converter 13 supplies the ES to an SDTI transmitting portion 14. The SDTI transmitting portion 14 converts the ES received from the format converter 13 into an SDTI format ES. The SDTI format ES is output to the outside of the apparatus. An MPEG video decoder 15 decodes the ES and outputs the resultant data as base band video data to the outside of the apparatus. The input of the recording side format converter 3 is connected to the output of the reproducing side format converter 13. The VCR also has a controller and a timing generator (they are omitted in FIG. 1). The controller is for example a CPU that controls all processes of the VCR. The controller and the timing generator are controlled by a host computer and a reference timing generator of a broadcasting station.

Figure 2B:
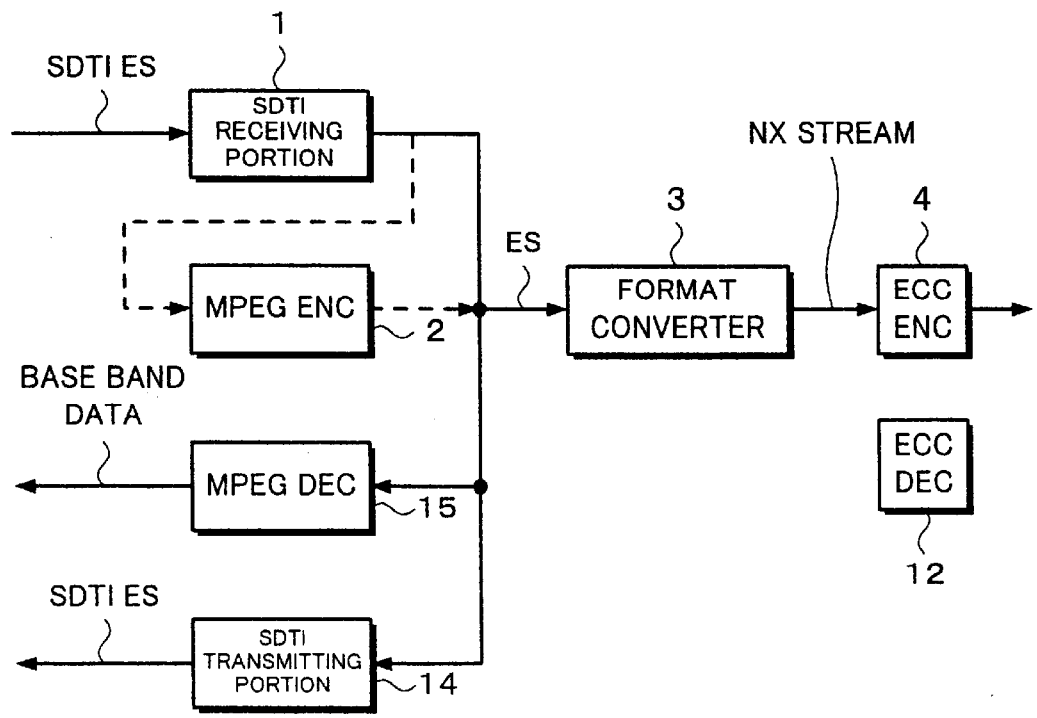

When data is recorded, the digital VCR is connected as shown in FIGS. 2A and 2B. FIG. 2A shows the structure of individual structural blocks in the case that base band video data is recorded. Video data is encoded by a video encoder 2. An ES is supplied from the encoder 2 to a format converter 3. The format converter 3 converts the ES into an NX stream. The NX stream is recorded on a record medium through an ECC encoder 4. In addition, the ES is output to the outside of the digital VCR through a video decoder 15. The data that is output to the outside of the digital VCR is monitored. FIG. 2B shows the structure of individual structural blocks in the case that an ES is recorded through an SDTI receiving portion 1. With a path denoted by a dotted line, an ES is supplied from the SDTI receiving portion 1 to a video encoder 2. For example, the data amount for one frame may be controlled.

Figure 3A:
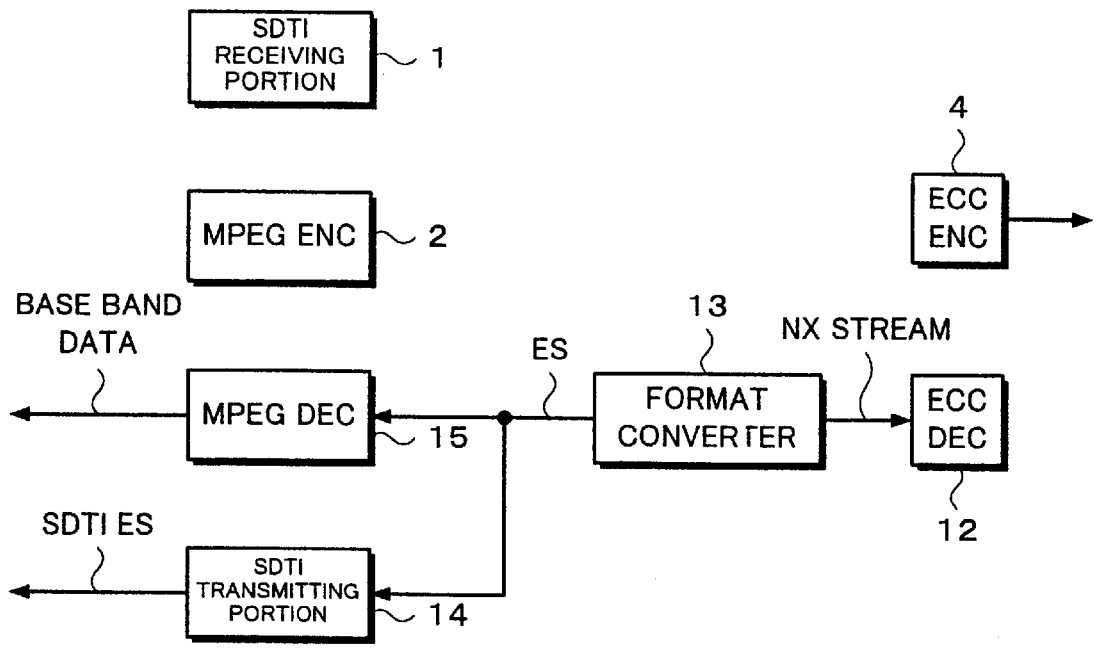
FIGS. 3A and 3B are block diagrams showing the structures of individual structural blocks in reproducing operations according to the present invention.
Figure 3B:
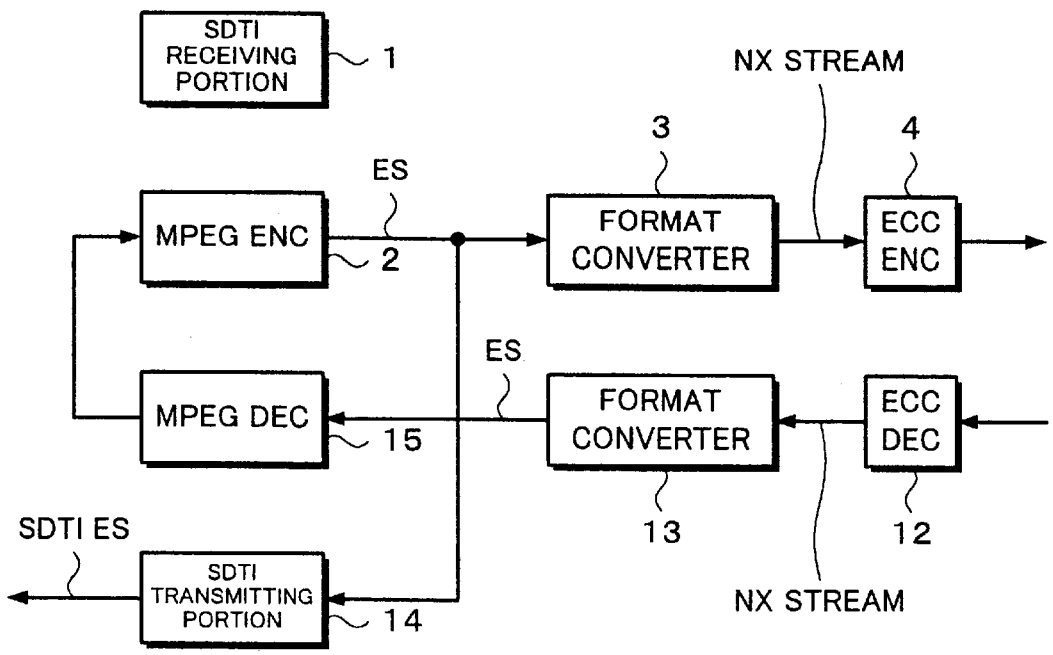

FIGS. 3A and 3B show the structures of individual structural blocks in the case that data is reproduced. FIG. 3A shows the structure of individual structural blocks in the case a normal reproducing operation is performed. Data is reproduced from a record medium 6. The reproduced data is supplied to an ECC decoder 12 through a reproducing portion 11. An NX stream is supplied from the ECC decoder 12 to a format converter 13. The format converter 13 output a reproduced ES. The reproduced ES is output as an SDTI ES to the outside of the digital VCR through an SDTI transmitting portion 14. In addition, the reproduced ES is decoded by an MPEG decoder 15 and output as base band data to the outside of the digital VCR. FIG. 3B shows the structure of individual structural blocks in the case that a read-modify-write operation is performed. Referring to FIG. 3B, an ES reproduced in the same manner as the normal reproducing operation is supplied from a video decoder 15 to a video encoder 2. The ES is supplied to a recording side format converter 3. When the delay of data by the decoder 15 and the encoder 2 is large, the read-modify-write operation cannot be performed. However, according to the present invention, as mentioned above, since the delay is small, such a problem does not take place.

Figure 4:
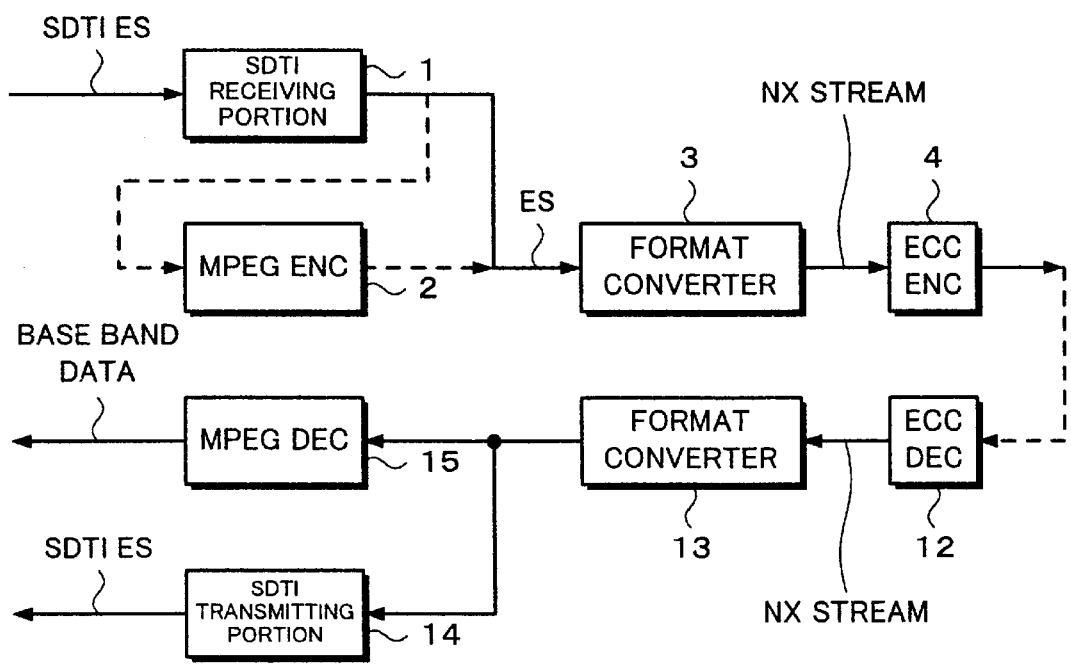
FIG. 4 is a block diagram showing the structure of individual structural blocks in a dubbing operation according to the present invention.

FIG. 4 shows the structure of individual structural blocks in the case that a dubbing operation is performed. Referring to FIG. 4, an SDTI ES is supplied from an SDTI receiving portion 1 (or a video encoder 2) to a format converter 3. The format converter 3 converts the SDTI ES into an NX stream. The NX stream is supplied to an ECC encoder 4. The ECC encoder 4 processes the NX stream and records the resultant data to a record medium 6. The recorded data is immediately reproduced. The reproduced data is supplied as an ES through an ECC decoder 12 and a format converter 13. The ES is supplied to a video decoder 15. The video decoder 15 outputs the ES as video data to the outside of the digital VCR. The ES is also supplied to an SDTI transmitting portion 14. The SDTI transmitting portion 14 outputs the ES as an SDTI ES to the outside of the digital VCR.

Figure 5:
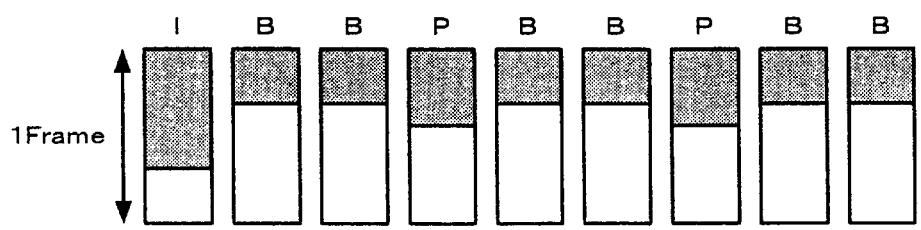
FIG. 5 is a schematic diagram showing a stream transmitting method according to the present invention.

To transmit an ES, as described above, an SDTI-CP is used. The SDTI-CP has been proposed as SMPTE standard. In the SDTI-CP format, an MPEG ES is separated to an access unit. The MPEG ES is packetized as packets corresponding to frames. The SDTI-CP has a sufficient transmission band (27 MHz or 36 MHz as a clock rate; 270 Mbps or 360 Mbps as a stream bit rate). As shown in FIG. 5, an ES can be transmitted as bursts in one frame interval. FIG. 5 shows the case that a normal MPEG ES is transmitted. In each frame interval, data is represented as a shaded portion.

Figure 6:
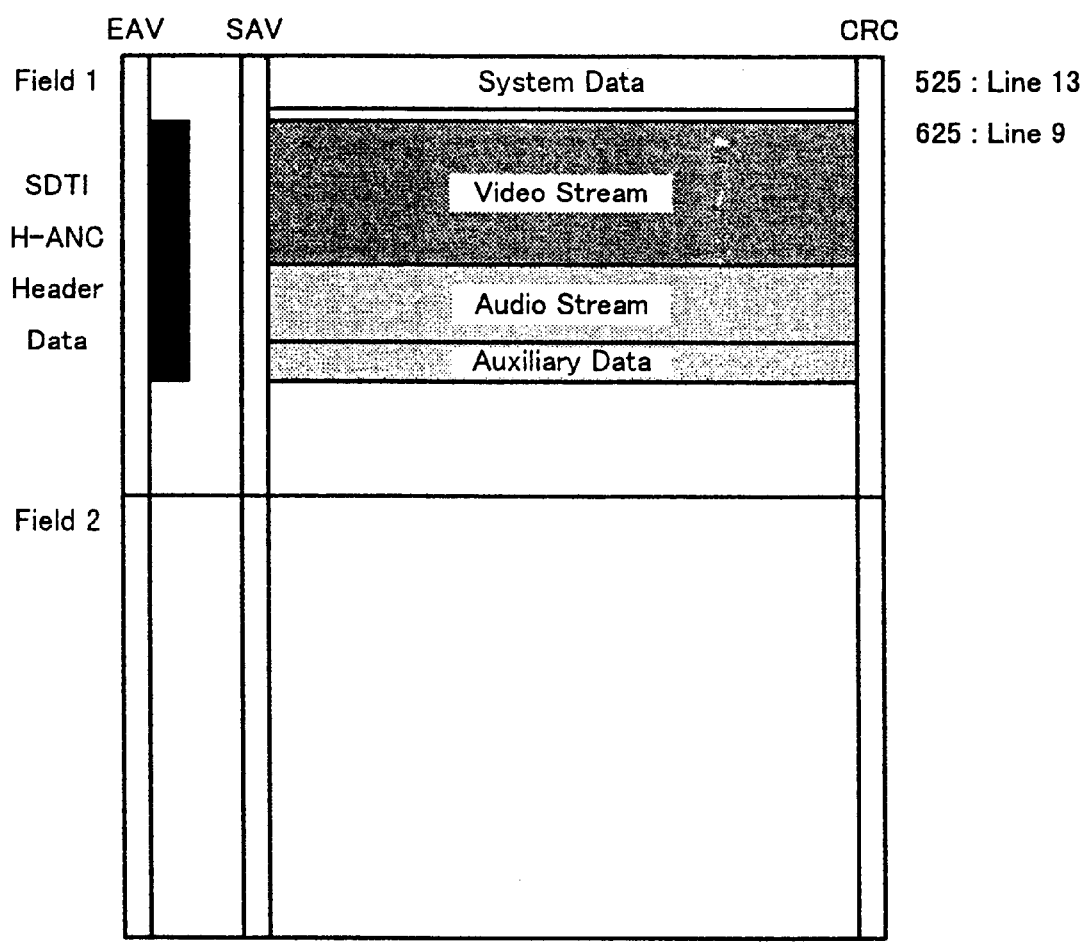
FIG. 6 is a schematic diagram showing an example of the packet structure in a stream transmitting method according to the present invention.

FIG. 6 shows the structure of a packet. Referring to FIG. 6, an EVA and an SAV are timing reference signals placed on each line. A payload is placed in a region starting with the SAV and ending with the EAV. Header data is placed between the EAV and the SAV. Ancillary data (video ancillary data, video index, and so forth) and user data can be placed in this region. The header data contains a line number, a source address, a block type, and so forth. The block type is data that represents the block length and so forth. With data type contained in each block, the type of a stream (ES, TS, or the like) can be distinguished.

Between SAV and EAV, system data, video stream, audio stream, and AUX data are placed. Data is not equally placed in one frame period. Instead, data is placed as bursts at the beginning for a predetermined period of one frame. At the boundary of a frame, an SDTI-CP (video data and audio data) can be switched as a stream. When the SDTI-CP is contents that use an SMPTE time code as a clock reference, the SDTI-CP causes audio data to synchronize with video data. In addition, the format of the SDTI-CP allows it to co-exist with an SDI.

As with the case that a TS is transmitted, in the interface using the SDTI-CP, it is not necessary to supply the SDTI-CP to a VBV (Video Buffer Verifier) buffer and TBs (Transport Buffers). Thus, the delay can be reduced. In addition, since the SDTI-CP is transmitted at very high speed, the delay can be further reduced. Consequently, in the environment where a synchronous signal for controlling the entire broadcasting station is available, it is effective to use an SDTI-CP.

Figure 7:
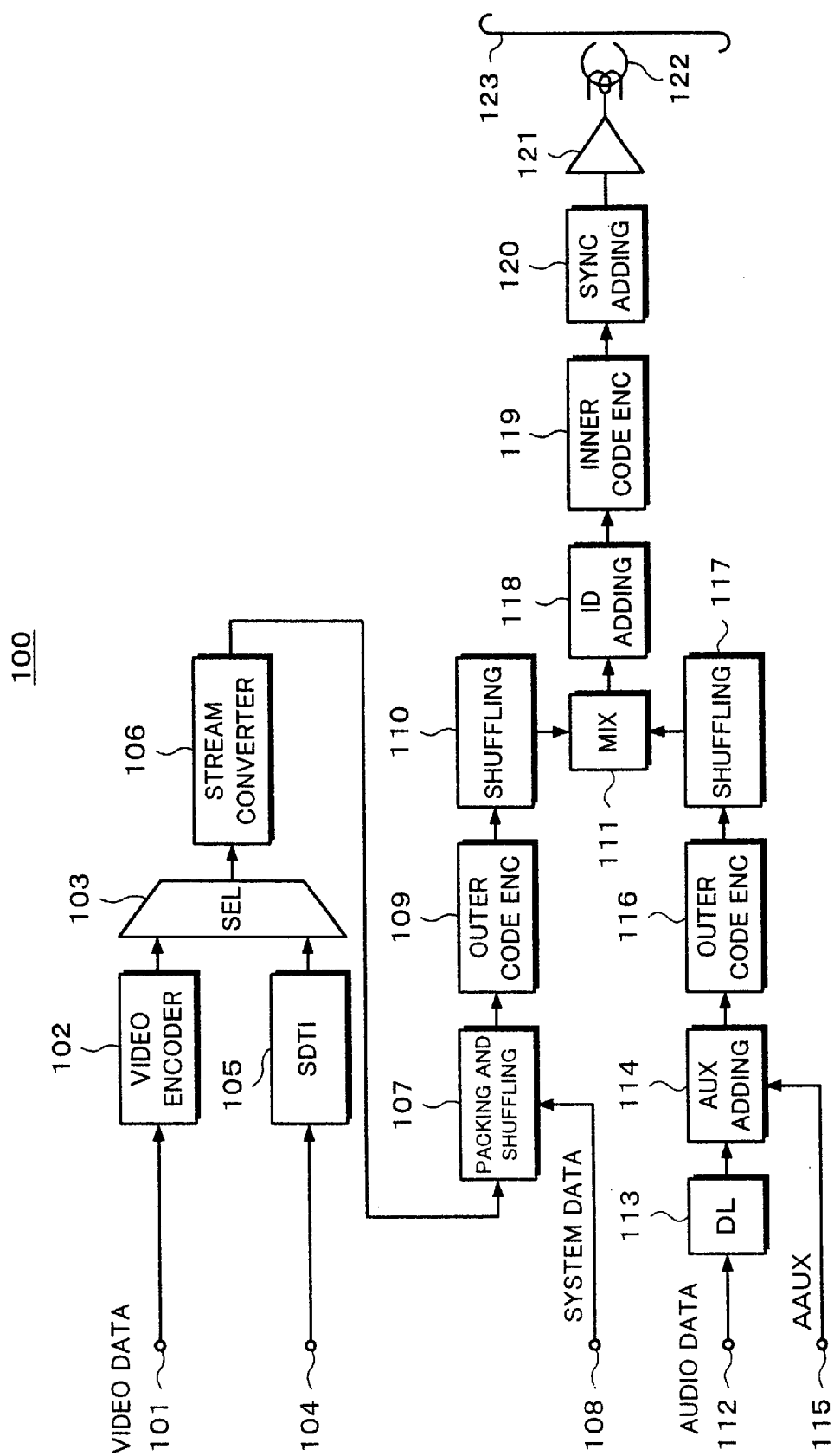
FIG. 7 is a block diagram showing the structure of a recording side according to the embodiment of the present invention.

Next, an embodiment of the present invention that has been described in brief will be described. FIG. 7 shows an example of the structure of a recording side of the recording and reproducing apparatus according to the embodiment of the present invention. When data is recorded, a digital video signal is input from a terminal 101 through a receiving portion of a predetermined interface—for example—SDI (Serial Data Interface). The input video signal is sent to a video encoder 102. The video encoder 102 performs a DCT (Discrete Cosine Transform) process for the video signal so as to convert the video signal into coefficient data and encode the coefficient data to variable length code (VLC) data. The variable length code data supplied from the video encoder 102 is an elementary stream corresponding to the MPEG2 standard. The variable length code data is sent to one input terminal of a selector 103.

In addition, data in the format of SDTI (Serial Data Transform Interface) is input through an input terminal 104. This signal is synchronously detected by an SDTI receiving portion 105. The signal is temporarily stored in a buffer. In the buffer, an elementary stream is extracted from the signal. The extracted elementary stream is sent to the other input terminal of the selector 103.

An ES that is selected by the selector 103 is sent to a stream converter 106. The stream converter 106 arranges DCT coefficients of a plurality of DCT blocks corresponding to individual frequency components and rearranges the resultant frequency components. In addition, the stream converter 106 corresponds to the recording side format converter shown in FIG. 1. Thus, the stream converter 106 converts the ES into a device stream suitable for the recording process of the digital VCR.

The stream converter 106 converts an ES so that the relation of one slice=one macro block is satisfied. In addition, the format converter 3 assembles non-video data as one slice (referred to as slice 0). Moreover, the format converter 3 limites the maximum length of one slice of video data (referred to as slice X) and the maximum length of one slice of slice 0. In addition, the format converter 3 rearranges coefficient data of DCTs. A sequence header, a GOP header, and a picture header of non-video data of slice 0 are added to each picture. In addition, when an outer ES whose data amount par GOP (in this example, one frame) exceeds a target value is input, the stream converter 106 substitutes higher frequency AC coefficients with zero so as to suppress the data amount. The stream converter 106 outputs a stream at a fixed bit rate (for example, eight bits wide) to the packing and shuffling portion 107.

To perform the converting process of the stream converter 106 in the minimum time period, coefficients are rearranged corresponding to a clock signal at a pixel rate so that the transfer rate of the bus for exchanging data becomes sufficient. When the pixel rate is 27 MHz and the data width is eight bits, the maximum length of variable length data is three times larger than the data width. Thus, since the maximum length of variable length data is 24 bits, a band width of 27 MHz×24 bits is required. In this case, the band width of the input/output data of the stream converter 106 may be 54 MHz×16 bits. In this case, it is not necessary to limit the maximum length of variable length data per macro block. When the maximum length of variable length data is limited, the band width that allows data of the maximum length to be transferred in the period of a macro block can be obtained. When the maximum length of variable length data is limited to 512 bytes, the stream converter 106 and the packing and shuffling portion 107 are interfaced using a band width of 27 MHz×8 bits.

Since video data in the ES has been encoded with a variable length code, the lengths of macro blocks are different. The packing and shuffling portion 107 packs each macro block in a fixed area. At this point, a portion that is not packed in the fixed area is successively packed in a blank portion against the size of the fixed area. System data containing a video format, a shuffling pattern version, and so forth is supplied from an input terminal 108 to the packing and shuffling portion 107. As with picture data, the packing and shuffling portion 107 performs the recording process for the system data. The system data is recorded as video AUX. The packing and shuffling portion 107 rearranges macro blocks of one frame that have taken in the scanning order and shuffles the macro blocks that are recorded on the magnetic tape. The shuffling process allows the update ratio of data that is partly reproduced in a variable speed reproducing mode to be improved.

Video data and system data (in the following description, unless noted, video data means both video data and system data) are supplied from the packing and shuffling portion 107 to an outer code encoder 109. The outer code encoder 109 uses a product code as an error correction code for the video data and the audio data. With the product code, a two-dimensional matrix of video data or audio data is encoded with an outer code in the vertical direction and with an inner code in the horizontal direction. Thus, data symbols are encoded two times. As the outer code and the inner code, Reed-Solomon code can be used.

Output data of the outer code encoder 109 is supplied to a shuffling portion 110. The shuffling portion 110 shuffles sync blocks of a plurality of ECC blocks. Thus, an error can be prevented from concentrating on a particular ECC block. The shuffling process performed by the shuffling portion 110 may be referred to as interleaving process. Output data of the shuffling portion 110 is supplied to a mixing portion 111. The mixing portion 111 mixes the output data of the shuffling portion 110 with audio data. As will be described later, the mixing portion 111 is composed of a main memory.

Audio data is received from an input terminal 112. According to the embodiment of the present invention, a non-compressed digital audio signal is handled. The digital audio signal is separated by an SDI receiving portion (not shown) of the input side or an SDTI receiving portion 105. Alternatively, the digital audio signal is input through an audio interface. The input digital audio signal is supplied to an AUX adding portion 114 through a delaying portion 113. The delaying portion 113 matches the phase of the audio signal with the phase of the video signal. Audio AUX received from an input terminal 115 is auxiliary data having information in association with audio data such as sampling frequency thereof. The AUX adding portion 114 adds the audio AUX to audio data. The audio AUX is treated in the same manner as audio data.

Audio data and AUX data (in the following description, unless noted, audio data means both audio data and AUX data) are supplied to an outer code encoder 116. The outer code encoder 116 encodes audio data with an outer code. Output data of the outer code encoder 116 is supplied to a shuffling portion 117. The shuffling portion 117 shuffles the output data of the outer code encoder 116. The shuffling portion 117 shuffles audio data for each sync block or for each channel.

Output data of the shuffling portion 117 is supplied to the mixing portion 111. The mixing portion 111 mixes the video data and the audio data as data of one channel. Output data of the mixing portion 111 is supplied to an ID adding portion 118. The ID adding portion 118 adds an ID having information that represents a sync block number to the output data of the mixing portion 111. Output data of the ID adding portion 118 is supplied to an inner code encoder 119. The inner code encoder 119 encodes the output data of the ID adding portion 118 with an inner code. Output data of the inner code encoder 119 is supplied to a synchronization adding portion 120. The synchronization adding portion 120 adds a synchronous signal to each sync block. Thus, sync blocks are structured as successive record data. The record data is supplied to a rotating head 122 through a recording amplifier 121 and recorded on a magnetic tape 123. Actually, the rotating head 122 is composed of a plurality of magnetic heads with different azimuths and a rotating drum on which the magnetic heads are disposed.

When necessary, a scramble process may be performed for record data. In addition, when data is recorded, it may be digital-modulated. Moreover, partial response class 4 and Viterbi encoding process may be used.

Figure 8:
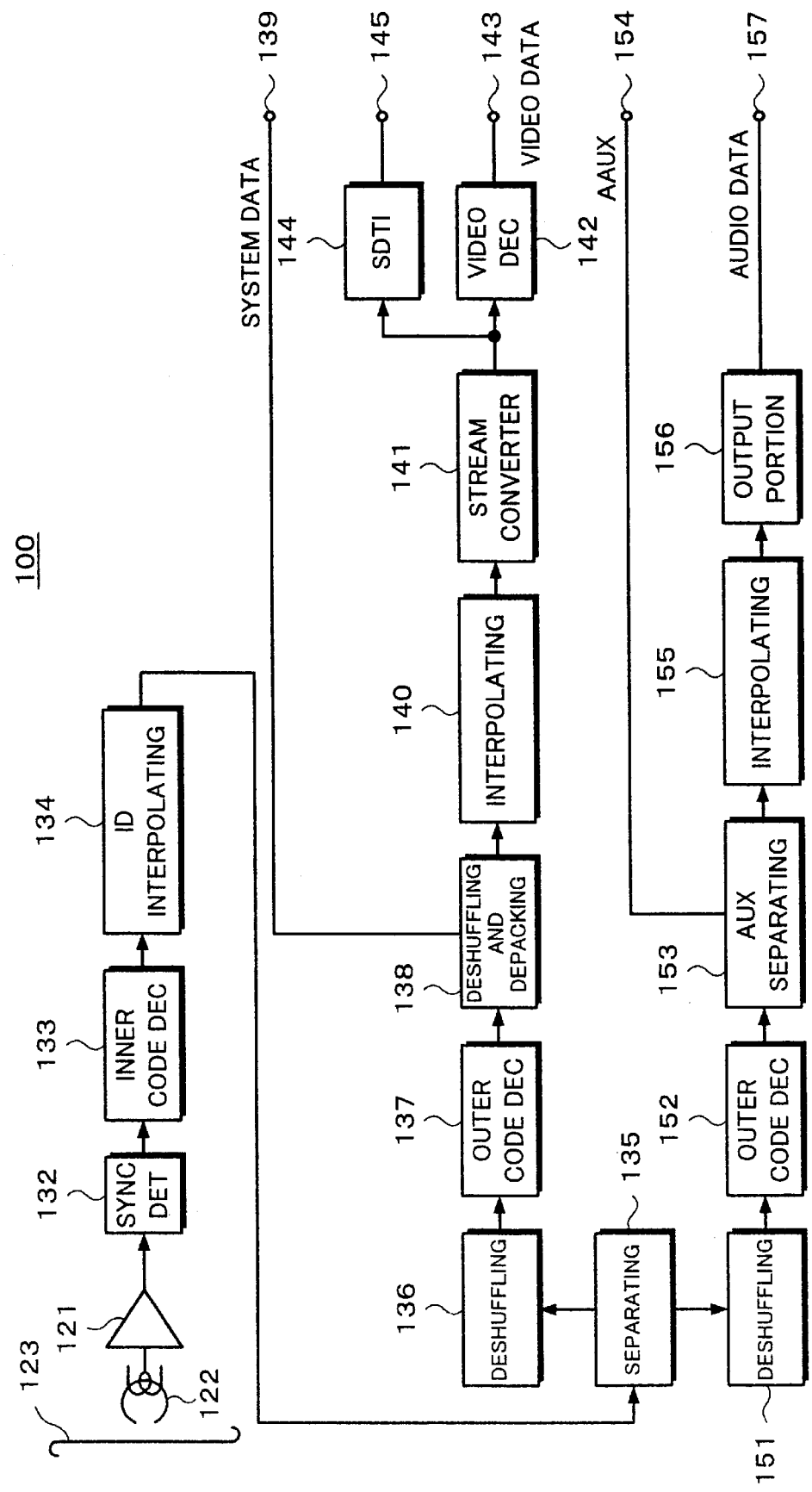
FIG. 8 is a block diagram showing the structure of a reproducing side according to the embodiment of the present invention.

FIG. 8 shows an example of the structure of a reproducing side according to the embodiment of the present invention. A signal reproduced from a magnetic tape 123 by a rotating head 122 is supplied to a synchronization detecting portion 132 through a reproducing amplifier 131. An equalizing process and a waveform trimming process are performed for the reproduction signal. When necessary, a digital demodulating process and Viterbi decoding process are performed. The synchronization detecting portion 132 detects a synchronous signal at the beginning of a sync block and extracts the sync block.

Output data of the synchronization detecting portion 132 is supplied to an inner code encoder 133. The inner code encoder 133 corrects an error of the output data of the synchronization detecting portion 132 with an inner code. Output data of the inner code encoder 133 is supplied to an ID compensating portion 134. The ID interpolating portion 134 interpolates an ID (for example, a sync block number) of a sync block of which an error has been detected with an inner block. Output data of the ID interpolating portion 134 is supplied to a separating portion 135. The separating portion 135 separates the output data of the ID interpolating portion 134 into video data and audio data. As described above, the video data contains DCT coefficient data generated in the MPEG intra-encoding process and system data. Likewise, the audio data contains PCM (Pulse Code Modulation) data and AUX data.

A deshuffling portion 136 deshuffles video data received from the separating portion 135. The deshuffling portion 136 restores shuffled sync blocks shuffled by the shuffling portion 110 on the recording side to original sync blocks.

Output data of the deshuffling portion 136 is supplied to an outer code decoder 137. The outer code decoder 137 corrects an error of output data of the deshuffling portion 136 with an outer code. When an error of the data cannot be corrected, an error flag is placed thereto.

Output data of the outer code decoder 137 is supplied to a deshuffling and depacking portion 138. The deshuffling and depacking portion 138 deshuffles macro blocks that have been shuffled by the packing and shuffling portion on the recording side. In addition, the deshuffling and depacking portion 138 performs a depacking process for data that has been packed on the recording side. In other words, the deshuffling and depacking portion 138 restores fixed length macro blocks to original variable length codes. Moreover, the deshuffling and depacking portion 138 separates system data from the output data of the outer code decoder 137. The system data is obtained from an output terminal 139.

Output data of the deshuffling and depacking portion 138 is supplied to an interpolating portion 140. The interpolating portion 140 corrects data that has an error flag. When variable length data of a macro block (=one slice) has an error, DCT coefficients of frequency components of the rest of the macro block cannot be restored. In this case, data having an error is substituted with an EOB (End Of Block). DCT coefficients of frequency components after the EOB are set to zero. Likewise, in the high speed reproducing mode, only DCT coefficients corresponding to the length of a sync block are restored. DCT coefficients after the sync block are substituted with zero data. When a header (a sequence header, a GOP header, a picture header, user data, or the like) at the beginning of video data has an error, the interpolating portion 140 restores the header.

Since DCT coefficients of a plurality of DCT blocks are arranged in the order from DC components and from the lowest frequency component to the highest frequency component, even if DCT coefficients after a particular position are ignored, DCT coefficients of DC components and low frequency components can be placed in each of DCT blocks that compose a macro block.

Output data (a device stream) of the interpolating portion 140 is supplied to a stream converter 141. The stream converter 141 performs an inverse process of the process of the stream converter 106 on the recording side. In other words, the stream converter 141 rearranges DCT coefficients arranged in the order of frequency components in DCT blocks to DCT coefficients in the order of DCT blocks. Thus, the reproduction signal is converted into an ES corresponding to the MEPG2 standard.

An input signal and an output signal of the stream converter 141 have sufficient transmission rates (band widths) corresponding to the maximum length of macro blocks. When the length of macro blocks (slices) is not limited, it is preferred to secure a band width that is three times larger than the pixel rate.

Output data of the stream converter 141 is supplied to a video decoder 142. The video decoder 142 decodes an ES and outputs video data. In other words, the video decoder 142 performs a dequantizing process and an inverse DCT process. Decoded video data is obtained from an output terminal 143. As an interface to the outside of the apparatus, for example SDI is used. In addition, the stream converter 141 also supplies an ES to an SDTI transmitting portion 144. System data, reproduction audio data, and AUX data are also supplied to the SDTI transmitting portion 144 through relevant paths (not shown). The SDTI transmitting portion 144 converts these signals into an SDTI format stream. The stream is supplied from the SDTI transmitting portion 144 to the outside of the apparatus through an output terminal 145.

Audio data separated by the separating portion 135 is supplied to a deshuffling portion 151.

The deshuffling portion 151 performs an inverse process of the shuffling portion 117 on the recording side.

Output data of the deshuffling portion 117 is supplied to an outer code decoder 152. The outer code decoder 152 corrects an error of the output signal of the deshuffling portion 117 with an outer code. The outer code decoder 152 outputs audio data whose error has been corrected. When an error of the audio data cannot be corrected, an error flag is set thereto.

Output data of the outer code decoder 152 is supplied to an AUX separating portion 153. The AUX separating portion 153 separates audio AUX from the output data of the outer code decoder 152. The separated audio AUX is obtained from an output terminal 154. The separated audio data is supplied to an interpolating portion 155. The interpolating portion 155 interpolates a sample having an erro. As an interpolating method, a mean value interpolating method of which a particular sample is interpolated with the mean value of a correct sample followed by the particular sample and a correct sample preceded by the particular sample can be used. Alternatively, a preceding value holding method of which the preceding correct sample value is held can be used. Output data of the interpolating portion 155 is supplied to an output portion 156. The output portion 156 performs a mute process, a delay amount adjusting process, and so forth. In the mute process, an audio signal having an error that cannot be compensated is prohibited from being output. In the delay amount adjusting process, the phase of the audio signal is matched with the phase of the video signal. The output portion 156 supplies the reproduction audio signal to an output terminal 157.

The reproducing side according to the embodiment of the present invention also has a timing generating portion, a system controller (that is a microcomputer), and so forth (they are not shown in FIGS. 7 and 8). The timing generating portion generates a timing signal in synchronization with input data. The system controller controls the entire operations of the recording and reproducing apparatus.

According to the embodiment of the present invention, signals are recorded on a magnetic tape by helical scan method. In the helical scan method, inclined tracks are formed by magnetic heads disposed on a rotating head. A plurality of heads are disposed at opposite positions on the rotating drum. In the case that a magnetic tape is wound to the rotating head with a winding angle of around 180°, when the rotating head is turned by 180°, a plurality of tracks can be formed at a time. Two magnetic heads with different azimuths are disposed as one set on the rotating drum so that adjacent tracks have different azimuths.

Figure 9:
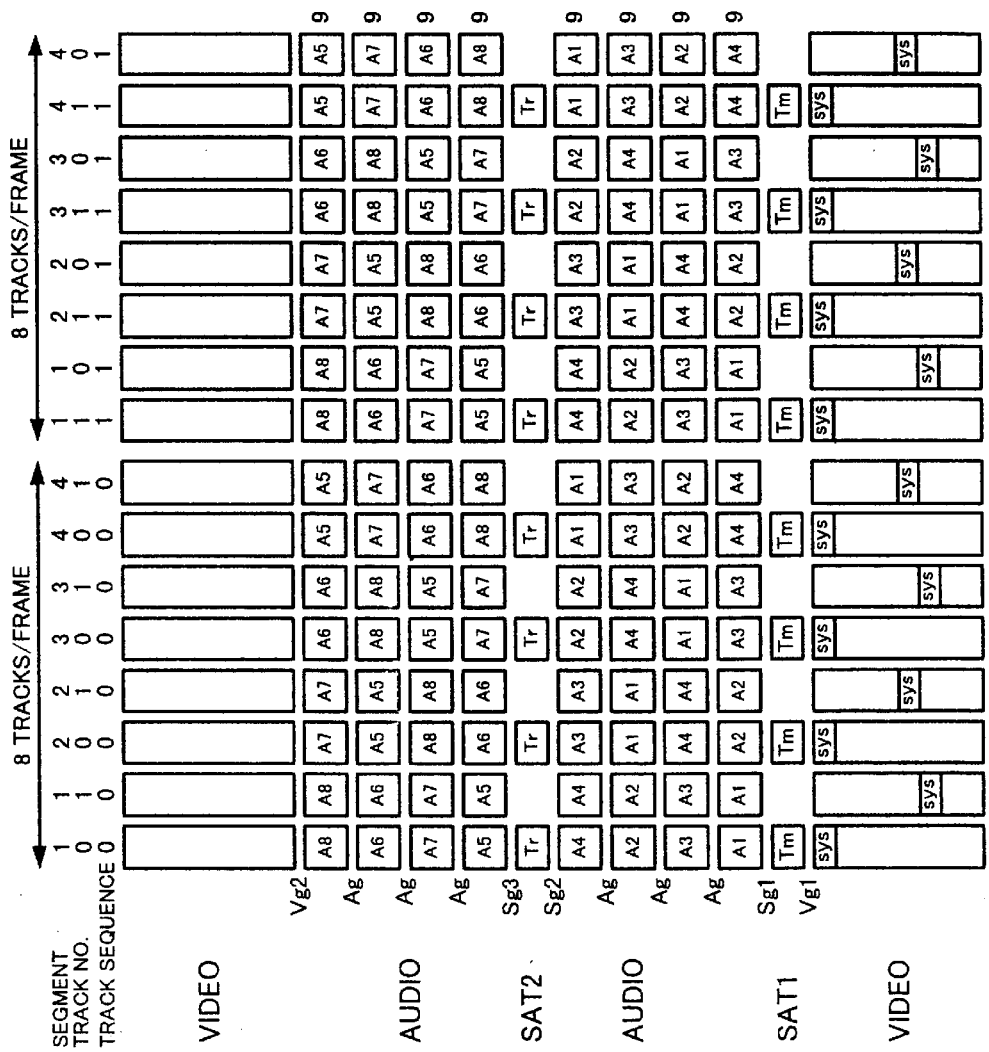
FIG. 9 is a schematic diagram showing an example of a track format.

FIG. 9 shows an example of the track format formed on a magnetic tape by the above-described rotating head. In this example, video data and audio data for one frame are recorded with eight tracks. For example, the 480*i* video signal of which the frame frequency is 29.97 Hz, the data rate is 50 Mbps, the number of effective lines is 480, and the number of effective horizontal pixels is 720 is recorded along with an audio signal. In addition, the 576*i* video signal of which the frame frequency is 25 Hz, the data rate is 50 Mbps, the number of effective lines is 576, and the number of effective horizontal pixels is 720 can be recorded along with an audio signal in the tape format shown in FIG. 9.

One segment is formed of two tracks with different azimuths. In other words, eight tracks are composed of four segments. A pair of tracks that form a segment are designated track number [0] and track number [1] corresponding to azimuths. In the example shown in FIG. 9, the track numbers of the first eight tracks are different from those of the second eight tracks. A unique track sequence is assigned to each frame. Thus, even if one of paired magnetic heads cannot read a signal due to clogging or the like, data of the preceding frame can be used. Thus, the influence of the error can be minimized.

Video sectors are formed on both edge sides in the longitudinal direction of each track. An audio sector for audio data is formed between the video sectors. FIGS. 9 and 10 also show positions of audio sectors on a tape.

In the track format shown in FIG. 9, audio data of eight channels can be handled. In FIG. 9, A1 to A8 represent sectors of audio data of channels 1 to 8, respectively. The positions of audio data of individual channels are varied segment by segment. In audio data, audio samples (800 samples or 801 samples in the case that the sampling frequency is 48 kHz) generated in one field period are separated into even-numbered samples and odd-numbered samples. These sample groups and AUX data compose one ECC block as a product code.

In FIG. 9, data for one field is recorded on four tracks. Thus, two ECC blocks per channel of audio data are recorded on four tracks. Data of the two ECC blocks (including an outer code parity) are divided into four sectors. As shown in FIG. 9, the divided data is dispersedly recorded on the four tracks. A plurality of sync blocks contained in the two ECC blocks are shuffled. For example, four sectors with for example reference number A1 form two ECC blocks of channel 1.

In this example, data of four ECC blocks per tack is shuffled (interleaved) and recorded to an upper side sector and a lower side sector. A system area is formed at a predetermined position of each lower side video sector.

In FIG. 9, SAT1 (Tr) and SAT2 (Tm) are areas for servo lock signals. Gaps (Vg1, Sg1, Ag, Sg2, Sg3, and Vg2) having a predetermined size each are formed between adjacent record areas.

In FIG. 9, data of one frame is recorded on eight tracks. However, depending on the format of record data or reproduction data, data of one frame can be recorded on four tracks or six tracks. FIG. 10A shows the format of six tracks per frame. In this example, the track sequence is only [0].

As shown in FIG. 10B, data recorded on a tape is composed of a plurality of blocks that are divided at equal intervals. The blocks are referred to as sync blocks. FIG. 10C shows an outlined structure of one sync block. As will be described later, one sync block is composed of a sync pattern, an ID, a DID, a data packet, and an error correction inner code parity. The sync pattern detects a synchronization. The ID identifies the current sync block. The DID represents the contents of data that follows. Thus, data is composed of sync blocks as packets. In other words, the minimum data unit that is recorded and reproduced is one sync block. A sequence of sync blocks (see FIG. 10B) form for example a video sector (see FIG. 10A).

FIGS. 11A, 11B, 11C, 11D, and 11E show the data structures of sync blocks of video data. As described above, one sync block is the minimum data unit that is recorded and reproduced. According to the embodiment of the present invention, one sync block corresponding to the format of video data that is recorded contains data of one or two macro blocks (VLC data). The size of one sync block depends on the format of a video signal that is used. As shown in FIG.

11A, one sync block is composed of a sync pattern of two bytes, an ID of two bytes, a DID of one byte, a data area in the range from 112 bytes to 206 bytes, and a parity (that is a inner code parity) of 12 bytes that are successively arranged. The data area is also referred to as payload.

The sync pattern of two bytes is used to detect a synchronization. The sync pattern has a predetermined bit pattern. By detecting a sync pattern corresponding to a predetermined pattern, a synchronization is detected.

FIG. 12A shows examples of bit assignments of ID0 and ID1. ID1 contains important information unique to the current sync block. The data size of each of ID0 and ID1 is one byte. ID0 contains identification information (that is a sync ID) for identifying a sync block in one track. The sync ID is a serial number of a sync block of the sector. The sync ID is composed of eight bits. A sync block of video data and a sync block of audio data are designated different sync IDs.

ID1 contains track information against the current sync block. When the MSB side and the LSB side are bit 7 and bit 0, respectively, bit 7 represents whether the current sync block is present on the upper side or the lower side of the track. Bits 5 to 2 represent a segment on the track. Bit 1 represents a track number corresponding to the track azimuth. Bit 0 represents whether the current sync block is video data or audio data.

FIG. 12B shows an example of the bit assignment of the DID in the case that the data area of the current sync block is video data. The DID contains information of the payload of the current sync block. The contents of the DID depend on the value of bit 0 of the ID1. When bit 1 of the ID1 represents video data, bits 7 to 4 of the DID are reserved. Bits 3 and 2 of the DIC represent the mode of the payload. The mode is for example the type of the payload. Bits 3 and 2 of the DID represent auxiliary information. Bit 1 of the DID represents whether the payload stores one or two macro blocks. Bit 0 of the DID represents whether or not video data stored in the payload is an outer code parity.

FIG. 12C shows an example of the bit assignment of the DID in the case that the data area of the current sync block is audio data. Bits 7 to 4 of the DID are reserved. Bit 3 of the DID represents whether data stored in the payload of the current sync block is audio data or conventional data. When the payload stores compression-encoded audio data, bit 3 of the DID represents data. Bits 2 to 0 of the DID stores information of NTSC five-field sequence. In other words, in the NTSC standard, when the sampling frequency is 48 kHz, one field of a video signal is equal to 800 samples or 801 samples of an audio signal. This sequence is completed every five fields. Bits 2 to 0 of the DID represents the position of the sequence.

FIGS. 11B to 11E show examples of the payload. In FIGS. 11B and 11C, the payload stores video data of one or two macro blocks (as non-equal length data), respectively. In FIG. 11B, the payload stores one macro block. In this case, the first three bytes of the payload contains data length mark LT that represents the length of the non-equal length data corresponding to the macro block. The data length mark LT may or may not contain the length thereof. In FIG. 11C, the payload stores two macro blocks. In this case, the data length mark LT of the first macro block, the first macro block, the data length mark LT of the second macro block, and the second macro block are successively disposed. The data length mark LT is required to depack a macro block.

FIG. 11D shows the case that the payload stores video AUX (auxiliary) data. In FIG. 11D, at the beginning of the payload, data length mark LT is disposed. The data length mark LT represents the length of video AUX data. The data length mark LT is followed by system information of five bytes, PICT information of 12 bytes, and user information of 92 bytes. The remaining area of the payload is reserved.

FIG. 11E shows the case that the payload stores audio data. Audio data can be packed in all the length of the payload. The audio signal is for example a PCM signal that is not compressed. Alternatively, the audio signal may be compression-encoded corresponding to a particular method.

According to the embodiment, the length of the payload that is a data storage area of each sync block is optimized depending on whether the sync block is a video sync block or an audio sync block. Thus, the length of the payload of each video sync block is not equal to that of each audio sync block. In addition, the length of each video sync block and the length of each audio sync block are optimally set corresponding to the signal format for use. Thus, a plurality of different signal formats can be integrally handled.

FIG. 13 shows an example of the structure of a video encoder 102. A signal is supplied from a terminal 50 to a block segmenting circuit 51. The block segmenting circuit 51 segments the signal received from the terminal 50 to macro blocks each of which is composed of 16 pixels×16 lines. Each macro block is supplied to one input terminal of a subtracting device 54 and to a motion detecting circuit 60. The input video signal is also supplied to a statistic processing circuit 52. The statistic processing circuit 52 performs a predetermined statistic process so as to calculate the complexity of input video data. The calculated result is supplied to a bit rate controlling circuit 53.

The motion detecting circuit 60 compares the current macro block received from the block segmenting circuit 51 with a macro block received through a dequantizing circuit 63 and an inverse-DCT circuit 62. Thus, the motion detecting circuit 60 compares the current macro block with a macro block older than the current macro block by one frame (or one field). The motion detecting circuit 60 outputs motion information (that is a moving vector) corresponding to the compared result. A motion compensating circuit 61 performs a motion compensating process corresponding to the motion information. Output data of the motion compensating circuit 61 is supplied to the other input terminal of the subtracting device 54.

The subtracting device 54 outputs the difference between the input video data and the motion compensated result to a DCT circuit 55. The DCT circuit 55 divides the macro block into DCT blocks each of which is composed of 8 pixels x 8 lines, performs a DCT process for each of the DCT blocks, and outputs DCT coefficients to a quantizing circuit 56. The quantizing circuit 56 quantizes the DCT coefficients. At this point, the quantizing circuit 56 controls the bit rate of the DCT coefficients corresponding to control information received from a bit rate controlling circuit 53. The quantized DCT coefficients are supplied to the dequantizing circuit 63 and a zigzag scanning circuit 57.

The zigzag scanning circuit 57 zigzag-scans the DCT coefficients and rearranges them in the order of a DC component and from the lowest frequency component to the highest frequency component. A VLC circuit 58 encodes the DCT coefficients with a variable length code and outputs the resultant data as an ES corresponding to the MPEG2 standard to an output terminal 59. The output ES is variable length code encoded data as macro blocks and has the relation of which one slice is one macro block.

According to the embodiment of the present invention, since each GOP is composed of only I pictures, the structural blocks for performing the inter-frame motion compensating predictive process (these blocks are for example the motion detecting circuit 60, the motion compensating circuit 61, and the local decoder) can be omitted.

Figure 14A:
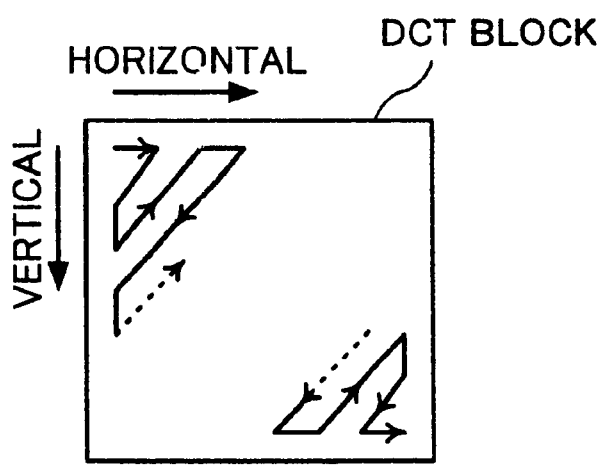
FIGS. 14A and 14B are schematic diagrams for explaining an output method and a variable length code encoding process of a video encoder according to the present invention.

FIG. 14A shows the order of DCT coefficients of video data that are output from a DCT circuit of an.

Figure 14B:
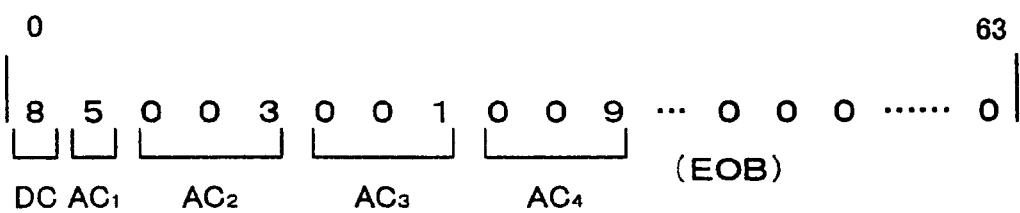

MPEG encoder. DCT coefficients are output in the order from a DC component at the upper left position of a DCT block to higher horizontal/vertical frequency components in zigzag scanning method. Thus, as shown in FIG. 14B, a total of 64 DCT coefficients (8 pixels×8 lines) are obtained in the order of frequency components.

The DCT coefficients are encoded with a variable length code by a VLC portion of the MPEG encoder. In other words, the first coefficient is a DC component that is a fixed component. The next components (AC components) are assigned codes corresponding to zero-runs and levels that follow. Thus, since the variable-length code encoded output data against coefficient data of AC components are arranged in the order from the lowest frequency component (lowest order coefficient) to the highest frequency component (highest order coefficient) such as $AC_1, AC_2, AC_3, \ldots$ An ES contains the DCT coefficients that have been encoded with a variable length code. The variable length code encoding process is performed for each slice. According to the embodiment of the present invention, the variable length code encoding process is performed for each macro block.

The stream converter 106 rearranges DCT coefficients of the received signal. In other words, the stream converter 106 rearranges DCT coefficients arranged in the order of frequency components in each DCT block into DCT coefficients in the order of frequency components of all DCT blocks of the macro block.

Figure 15A:
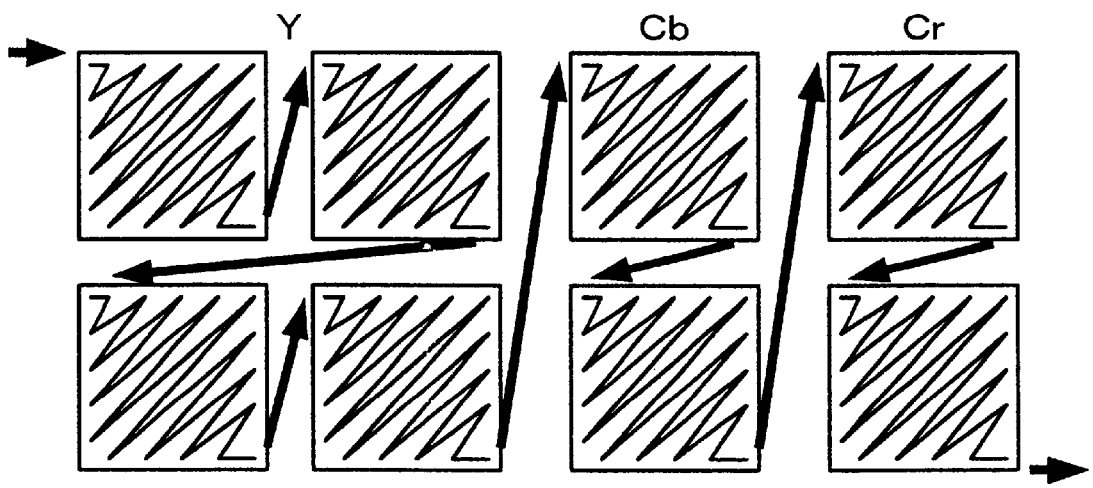
FIGS. 15A and 15B are schematic diagrams for explaining a rearrangement of output data of the video encoder according to the present invention.
Figure 15B:
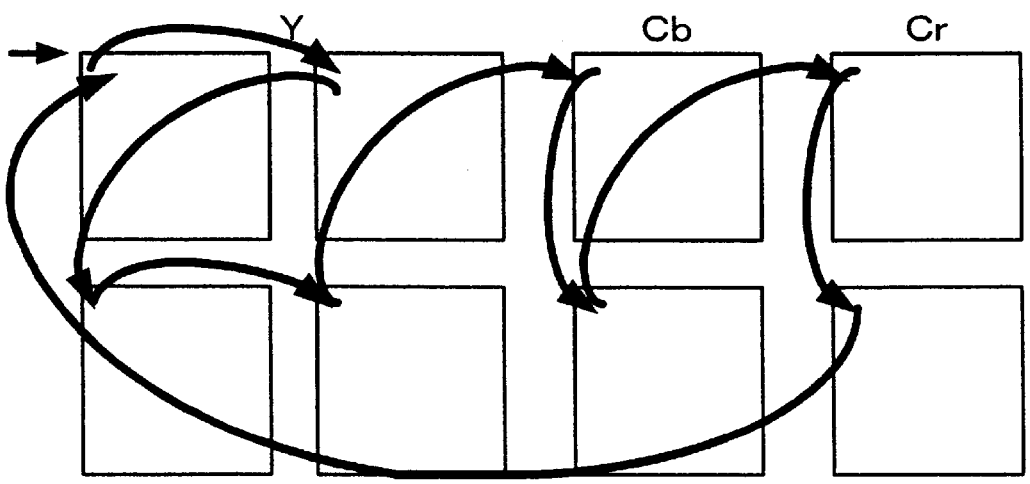

FIGS. 15A and 15B show DCT coefficients rearranged by the stream converter 106. In the case of a (4:2:2) component signal, one macro block is composed of four DCT blocks ($Y_1$, $Y_2$, $Y_3$, and $Y_4$) of a luminance signal Y, two DCT blocks ($Cb_1$ and $Cb_2$) of a chrominance signal Cb, and two DCT blocks ($Cr_1$ and $Cr_2$) of a chrominance signal Cr.

As described above, the video encoder 102 zigzag-scans DCT coefficients in the order from a DC component to higher frequency components for each DCT block corresponding to the MPEG2 standard. As shown in FIG. 15A, after the video encoder 102 has zigzag-scanned DCT coefficients for one DCT block, the video encoder 102 zigzag-scans DCT coefficients for the next DCT block so as to arrange the DCT coefficients.

In other words, DCT coefficients of each of the DCT blocks $Y_1$, $Y_2$, $Y_3$, and $Y_4$ and the DTC blocks $Cb_1$, $Cb_2$, $Cr_1$, and $Cr_2$ of the macro block are arranged in the order from the DC component to higher frequency components. The variable-length code encoding process is performed in such a manner that codes are designated to sets of runs and levels that follow (for example, DC, $AC_1$, $AC_2$, $AC_3$, ...).

The stream converter 106 interprets a variable length code of DCT coefficients, detects ends of individual coefficients, and arranges the coefficients corresponding to the individual frequency components of the DCT blocks of the macro block. FIG. 15B shows such a rearranging process. First of all, DC components of eight DCT blocks of the macro block are collected. Next, the lowest frequency AC coefficient components of the eight DCT blocks of the macro block are collected. Thereafter, the next lowest frequency AC coefficient components of the eight DCT blocks of the macro block are collected. In such a manner, coefficient data is rearranged for eight DCT blocks so that AC coefficients corresponding to individual orders are collected.

Rearranged coefficients are $DC(Y_1)$, $DC(Y_2)$, $DC(Y_3)$, $DC(Y_4)$, $DC(Cb_1)$, $DC(Cb_2)$, $DC(Cr_1)$, $DC(Cr_2)$, $AC1(Y_1)$, $AC1(Y_2)$, $AC1(Y_3)$, $AC1(Y_4)$, $AC1(Cb_1)$, $AC1(Cb_2)$, $AC1(Cr_1)$, $AC1(Cr_2)$, ... (where DC, AC1, AC2, ... represent variable length code symbols designated sets of runs and levels that follow). Since the coefficients are rearranged, DC components and low order AC components that are important for restoring a picture are placed at the beginning of the variable length data of the sync block. Thus, the resistance against an error is improved. In addition, the picture updating rate in the variable speed reproducing operation is improved.

A converted ES of which coefficient data has been rearranged by the stream converter 106 is supplied to the packing and shuffling portion 107. The length of data of a macro block of a converted ES is the same as that of a macro block of a non-converted ES. In the video encoder 102, even if the length of each GOP (one frame) is fixed by a bit-rate controlling operation, the length of each macro block is varied. The packing and shuffling portion 107 packs data of a macro block to a fixed area.

Figure 16A:
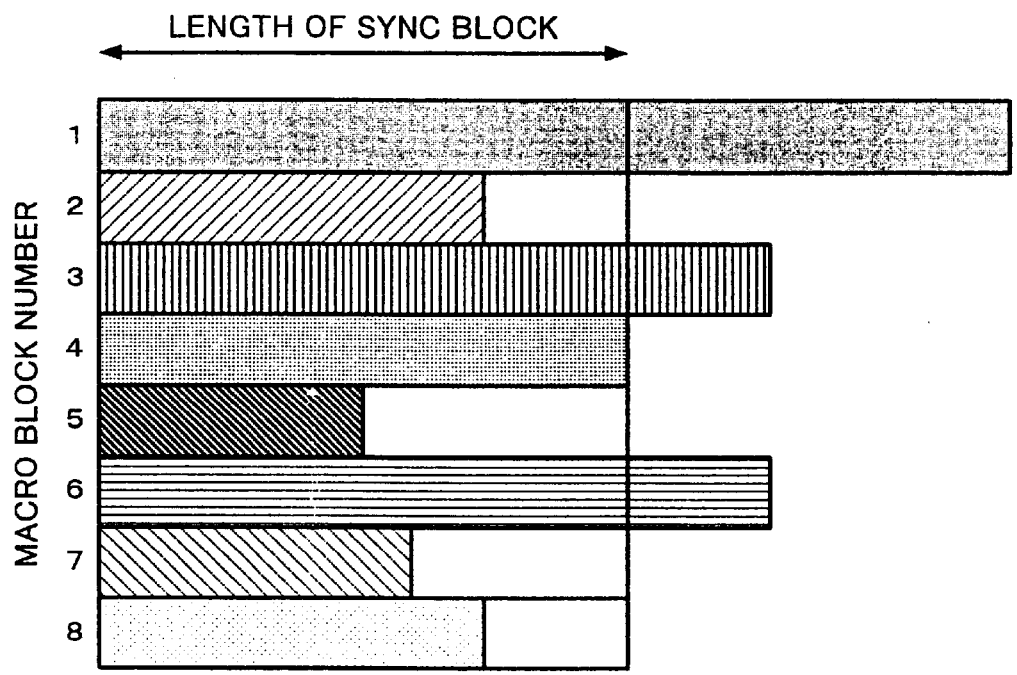
FIGS. 16A and 16B are schematic diagrams for explaining a process for packing rearranged data to sync blocks.
Figure 16B:
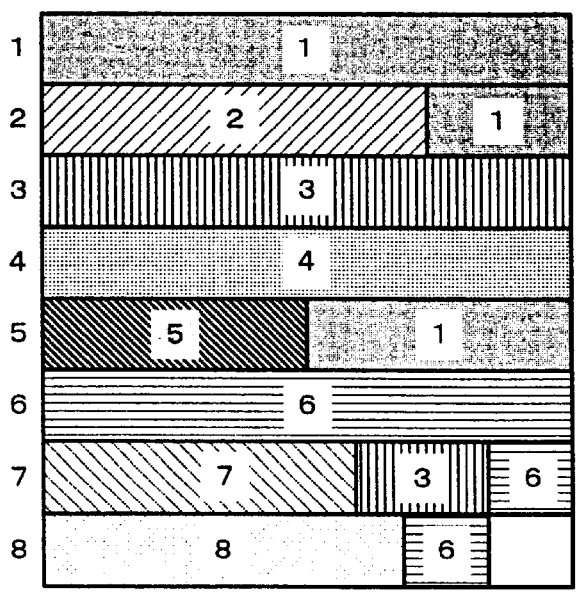

FIGS. 16A and 16B show a packing process for macro blocks performed by the packing and shuffling portion 107. Macro blocks are packed in a fixed area having a predetermined data length. The data length of the fixed area is matched with the length of one sync block that is the minimum unit of data that is recorded and reproduced. Thus, the shuffling process and the error correction code encoding process can be simplified. In FIGS. 16A and 16B, it is assumed that one frame contains eight macro blocks.

As shown in FIG. 16A, in the variable length code encoding process, the lengths of the individual macro blocks are different from each other. In this example, the length of each of data of macro block #1, data of macro block #3, data of macro block #6 is larger than the length of one sync block as the fixed area. On the other hand, the length of each of data of macro block #2, data of macro block #5, data of macro block #7, and data of macro block #8 is smaller than the length of one sync block. The length of data of macro block #4 is almost equal to the length of data of one sync block.

In the packing process, each macro block is packed in the fixed area with the length of one sync block. This is because the data amount generated in one frame period is controlled to a fixed amount. As shown in FIG. 16B, a macro block longer than one sync block is divided at the position corresponding to the length of one sync block. The overflow portion of the macro block against the length of one sync block is packed to the rear blank portions of the other macro blocks each of which is shorter than the length of one macro block.

In the example shown in FIG. 16B, the overflow portion of macro block #1 against the length of one sync block is packed to the rear blank portion of macro block #2. When the length of macro block #2 and the overflow portion of macro block #1 exceeds the length of one sync block, the remaining overflow portion of macro block #1 is packed to the rear blank portion of macro block #5. Next, the overflow portion of macro block #3 is packed to the rear blank portion of macro block #7. In addition, the overflow portion of macro block #6 is packed to the rear blank portion of macro block #7. The further overflow portion of macro block #6 is packed to the rear blank portion of macro block #8. In such a manner, the individual macro blocks are packed to the fixed area with the length of one sync block.

The stream converter 106 can predetermine the length non-equal length data corresponding to each macro block.

Thus, the packing portion 107 can detect the last end of data of each macro block without need to decode VLC data and check the contents thereof.

Figure 17A:
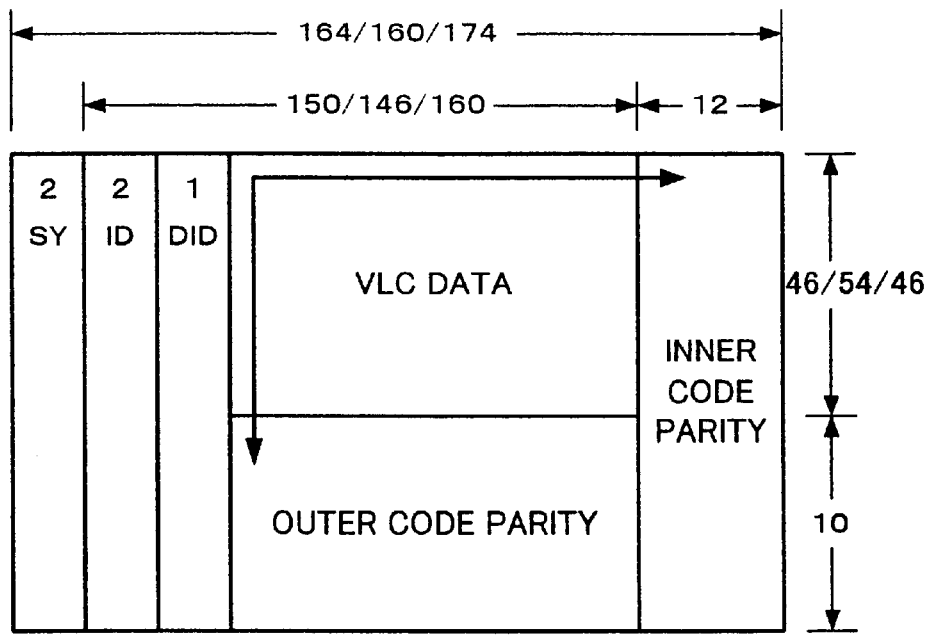
FIGS. 17A and 17B are schematic diagrams for explaining an error correction code encoding process for video data and audio data.
Figure 17B:
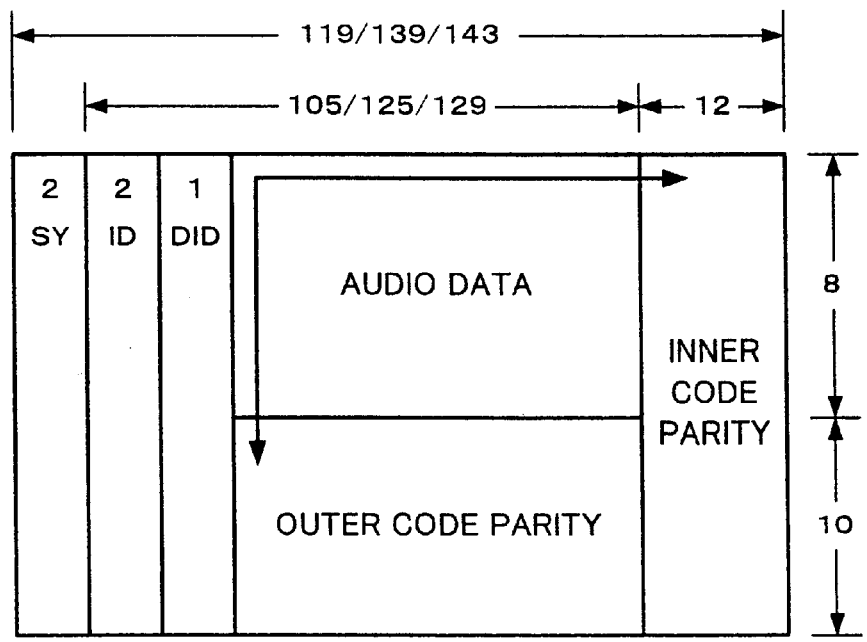

FIGS. 17A and 17B show examples of error correction codes according to the embodiment of the present invention. FIG. 17A shows one ECC block of error correction codes for video data. FIG. 17B shows one ECC block of error correction codes for audio data. In FIG. 17A, VLC data is data received from the packing and shuffling portion 107. A SYNC pattern, an ID, and a DID are added to each line of the VLC data. In addition, an inner code parity is added to each line of the VLC data. Thus, one sync block is formed.

In other words, a 10-byte outer code parity is composed of a predetermined number of symbols (bytes) arranged in the vertical direction of the VLC data. An inner code parity is composed of a predetermined number of symbols (bytes) of the ID, the DID, and the VLC data (or the outer code parity) arranged in the horizontal direction of the outer code parity. In the example shown in FIG. 17A, 10 outer code parity symbols and 12 inner code parity symbols are added. As a real error correction code, Reed Solomon code is used. In FIG. 17A, the length of VLC data in one sync block varies because the frame frequencies of video data vary as in 59.94 Hz and 23.976 Hz.

As with video data, as shown in FIG. 17B, a product code for audio data is used to generate 10 outer code parity symbols and 12 inner code parity symbols. In the case of audio data, the sampling frequency is for example 48 kHz. One sample is quantized to 24 bits. Alternatively, one sample may be quantized to other than 24 bits (for example, 16 bits). Corresponding to the frame frequency, the data amount of audio data in one sync block varies. As was described above, audio data for one field per channel composes two ECC blocks. One ECC block contains odd-numbered or even-numbered audio samples and audio AUX.

Figure 18:
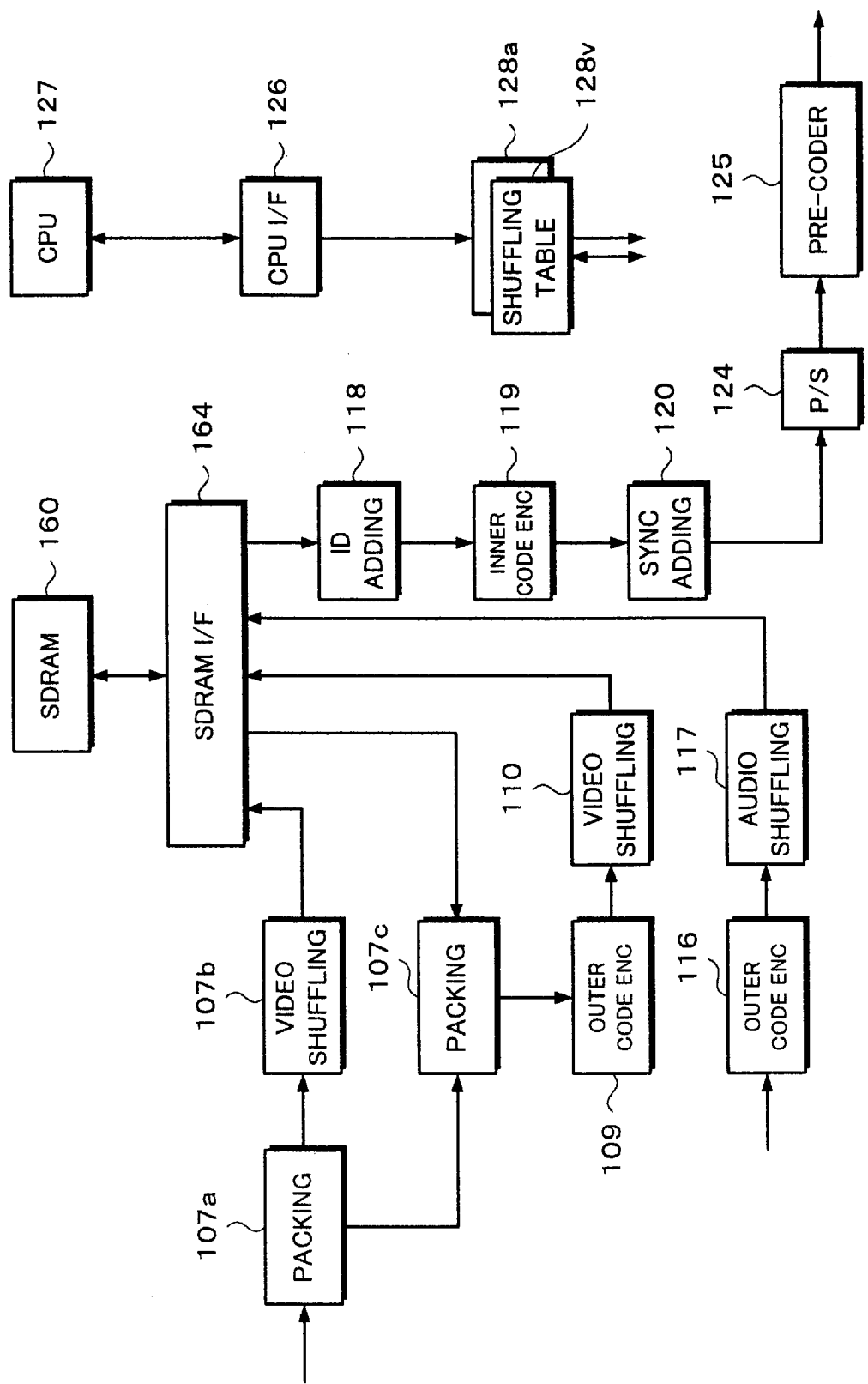
FIG. 18 is a block diagram showing a more practical structure of the record signal processing portion according to the present invention.

FIG. 18 shows a more practical example of the structure of the recording side according to the embodiment of the present invention. In FIG. 18, reference numeral 164 is an interface with an external main memory 160. The main memory 160 is composed of an SDRAM. The interface 164 coordinates a request issued from the recording side against the main memory 160 and performs a writing process and a reading process against the main memory 160. A packing and shuffling portion 107 is composed of a packing portion 107a, a video shuffling portion 107b, and a packing portion 107c.

Figure 19:
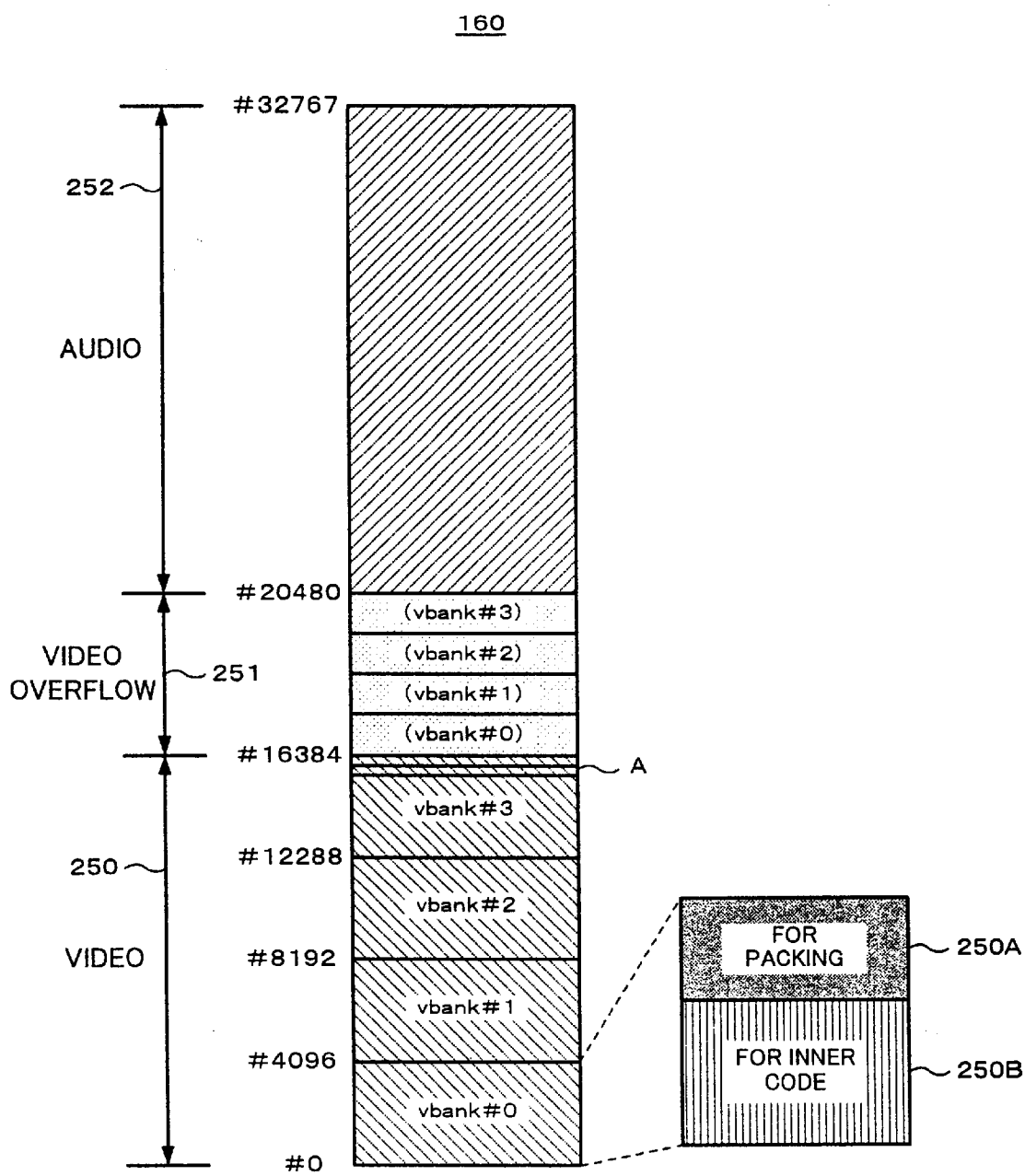
FIG. 19 is a schematic diagram showing a memory space of a memory used for the record signal processing portion according to the present invention.

FIG. 19 shows an example of the address structure of the main memory 160. The main memory 160 is composed of an SDRAM having a storage capacity of for example 64 Mbits. The main memory 160 has a video area 250, an overflow area 251, and an audio area 252. The video area 250 is composed of four banks (vbank #0, vbank #1, vbank #2, and vbank #3). Each of four banks can store one equal-length unit of a digital video signal. One equal-length unit is a unit of which the amount of generated data is controlled to a near target value. One equal-length unit is for example one picture (I picture) of a video signal. In FIG. 19, portion A represents a data portion of one sync block of a video signal. Data amount placed in one sync block depends on the format for use (see FIG. 11A). To handle a plurality of formats, the data size of one sync block exceeds the maximum size of bytes of the formats. Thus, as the data size of one sync block, the number of bytes suitable for the process is selected (for example, 256 bytes).

Each bank of the video area is divided into a packing area 250A and an output area 250B for an inner code encoder.

The overflow area 251 is composed of four banks corresponding to the video area. The main memory 160 has an area 252 for processing audio data.

According to the embodiment of the present invention, with reference to the data length mark LT of each macro block, the packing portion 107a stores fixed length data and overflow data that exceeds the fixed length data to respective areas of the main memory 160. The fixed length data is data whose data length is smaller than the data area of one sync block. Hereinafter, the fixed length data is referred to as block length data. Block length data is stored in the packing processing area 250A of each bank. When the data length of a macro block is smaller than the block length, a blank takes place in the relevant area of the main memory 160. The video shuffling portion 107b controls write addresses of the main memory 160 so as to perform a shuffling process. The video shuffling portion 107b shuffles only block length data. The video shuffling portion 107b does not shuffle the overflow portion, but writes it to an allocated area of the main memory 160.

The packing portion 107c packs and reads the overflow portion to the memory for the outer code encoder 109. In other words, block length data is read from the main memory 160 to a memory of one ECC block for the outer code encoder 109. If the block length data has a blank portion, the overflow portion is packed to the blank portion. When data of one ECC block is read, the reading process is temporarily stopped. At this point, the outer code encoder 109 generates an outer code parity. The outer code parity is stored in the memory of the outer code encoder 109. When the outer code encoder 109 has processed one ECC block, the outer code encoder 109 rearranges data and outer code parity in the order for the inner code encoding process and then writes the resultant data to the output area 250B that is different from the packing processing area 250A. The video shuffling portion 110 controls addresses of the main memory 160 so as to shuffle data that has been encoded with outer code for each sync block.

The process for separating data into block length data and overflow data and writing the block length data to the first area 250A of the main memory 160 (first packing process), the process for packing and writing the overflow data to the memory for the outer code encoder 109 (second packing process), and the process for generating outer code parity and writing data and outer code parity to the second area 250B of the main memory 160 are performed for each ECC block. When the outer code encoder 109 has a memory having a size of one ECC block, the access frequency of the accessing operation to the main memory can be reduced.

After the process for a predetermined number of ECC blocks contained in one picture (for example, 32 ECC blocks) is completed (namely, the packing process and outer code encoding process for one picture are completed), data that is read from the area 250B of the main memory 160 is supplied to an ID adding portion 118, an inner code encoder 119, and a synchronization adding portion 120 through the interface 164. The ID adding portion 118, the inner code encoder 119, and the synchronization adding portion 120 perform respective processes. Output data of the synchronization adding portion 120 is supplied to a parallel—serial converting portion 124. The parallel—serial converting portion 124 converts the output data of the synchronization adding portion 120 into bit serial data. The bit serial data is supplied to a partial response class 4 pre-coder 125. Output data of the pre-coder 125 is digitally modulated when necessary. The output data of the pre-coder 125 is supplied to a rotating head through a recording amplifier 121.

A sync block that does not have effective data (this sync block is referred to as null sync) may be placed in an ECC block so that it has flexibility against the type of the format of a record video signal. The null sync is generated by the packing portion 107a of the packing and shuffling block 107 and written to the main memory 160. Thus, since a null sync has a data record area, it can be used as a sync to which the overflow portion is recorded.

In the case of audio data, even numbered samples and odd numbered samples of audio data of one field compose different ECC blocks. Since an outer code sequence of an ECC block is composed of audio samples in the input order, whenever an audio sample of the outer code sequence is input, the outer code encoder 116 generates an outer code parity. The shuffling portion 117 controls addresses of the area 252 of the main memory 160 so as to shuffle output data of the outer code encoder 116 (for each channel or each sync block).

In addition, a CPU interface 126 is disposed. The CPU interface 126 receives data from an external CPU 127 that functions as a system controller and sets parameters to the inner blocks. To handle a plurality of formats, the CPU interface 126 can set many parameters such as sync block length and parity length. As one of the parameters, shuffling table data is stored in a video shuffling table (RAM) 128v and an audio shuffling table (RAM) 128a. The shuffling table 128v converts addresses for the video shuffling portions 107b and 110. The shuffling table 128a converts addresses for the audio shuffling portion 117.

As described above, the stream converter 106 generates video data (video data) of which the same frequency components of coefficient data (a variable length code) of macro blocks have been combined (sorted). By issuing a read request to the SDTI receiving portion 105, the stream converter 106 reads a stream from the buffer of the SDTI receiving portion 105. Alternatively, the packing and shuffling portion 107 may issue such a read request. The stream converter 106 also generates non-video data such as header information.

The non-video data are headers defined in the MPEG syntax (they are a PES header, a sequence header, a GOP header, and a picture header) and ancillary data contained as user data of a picture header (the ancillary data is for example a closed caption, a teletext, VITC, etc). The non-video data is variable length data whose data amount varies corresponding to the picture format, the data amount of user data, and so forth. In addition, it is difficult to estimate the maximum length of non-video data per frame. In the case of a video ES, it is also difficult to estimate the maximum length of the data per macro block. The MPEG syntax permits that the data amount per macro block exceeds that of original data. For example, all macro blocks of one frame may contain user data whose amount is larger than that of video data.

According to the embodiment of the present invention, since non-video data and video data are treated in the same manner, the stream converter 106 also supplies non-video data to the packing and shuffling portion 107. The packing and shuffling portion 107 packs non-video data along with video data. As with video data of one macro block, one fixed portion is assigned to non-video data. At the beginning of the fixed portion, a length mark is added. Thus, when the amount of generated data for one edit unit (for example, one frame period) is controlled, video data and non-video data are packed to fixed portions whose number is larger by 1 than the number of all macro blocks of one frame. According to the embodiment of the present invention, one GOP is composed of one I picture; one slice is composed of one macro block; and video data starts with slice 1. Thus, for convenience, non-video data is referred to as slice 0. Each slice of video data is referred to as slice X.

Next, with reference to FIGS. 20 and 21, an interface for data transmitted between the stream comparator 106 and the packing and shuffling portion 107 will be described. FIG. 20 shows the case that a slice X is transmitted as a stream (a stream NX in FIG. 1). In synchronization with a sync pulse shown in FIG. 20A, data of the slice X (a byte serial stream) is transmitted as shown in FIG. 20B. Although the transmission rate depends on the format of input video data, it is for example 50 Mbps that is the upper limit value in the MPEG standard. A base band clock signal with the same frequency as the transmission rate is used.

In the case of slice X, a sync pulse is generated at intervals of 544 clock pulses. Data is transmitted in the period of up to 512 clock pulses (512 bytes) of the 544 clock pulses. In each period, video data of one slice is transmitted. As described above, it is difficult to estimate the maximum length of video data generated in one macro block. However, according to the embodiment of the present invention, the stream converter 106 limits the maximum length in such a manner that the slice X does not exceed 512 bytes. In addition, as shown in FIG. 20C, the stream converter 106 generates an enable signal that goes high in the period corresponding to the length of a slice to be transmitted.

As shown in FIG. 20D, the packing and shuffling portion 107 (packing portion 107a) measures the high level period of the enable signal after the enable signal is reset with a sync pulse so as to detect the data length of a slice that is transmitted in each period. Although the packing and shuffling portion 106 may count the received data instead of transmitting the enable signal, since the stream converter 106 has known the stream, it is not necessary for the packing and shuffling portion 107 to analyze that. Thus, according to the embodiment of the present invention, the packing and shuffling portion 107 transmits the enable signal.

FIGS. 21A, 21B, 21C, 21D, and 21E are schematic diagrams for explaining the case that a slice 0 is transmitted as a stream (the stream NX in FIG. 1) from the stream converter 106 to the packing and shuffling portion 107. As shown in FIG. 21B, as with the slice X, the slice 0 is transmitted with a region of up to 512 of 544 clock pulses. However, as shown in FIG. 21A, until the slice 0 is completely transmitted, no sync pulse is generated. Thus, it represents that the slice 0 is one slice. As shown in FIG. 21C, the enable signal whose signal level goes high in the period of data is also transmitted. As shown in FIG. 21D, the packing and shuffling portion 107 (packing portion 107a) measures the high level period of the enable signal after it is reset with a sync pulse so as to detect the data length of the slice 0.

As shown in FIG. 20E, the slice X is defined as a fixed three-byte start code (000001)H (where H represents hexadecimal notation) followed by a slice start code (01)H to (AF)H. On the other hand, as shown in FIG. 20E, the slice 0 is defined as a fixed three-byte start code followed by a sequence header code (B3)H. To distinguish the slice 0 from the slice X, in the case of the slice 0, the start code is changed to (000000)H. Alternatively, to distinguish the slice 0 from the slice X, it is determined whether or not the start code (000001)H is followed by (B3)H.

In the above-described interface, the interval of sync pulses for the slice X is fixed to 544 clock pulses. The region of valid data is represented with the enable signal. The maximum length of the slice X is the interval of 512 clock pulses. In the slice X, the enable signal goes high and goes low once each in the interval of two sync pulses. On the other hand, in the slice 0, the enable signal goes high and low a plurality of times each in the interval of two sync pulses. In addition, as denoted by hatched regions of FIGS. 20B and 21B, in each of the slice 0 and the slice X, since the region of the valid data is shorter than the interval of two sync pulses, there is a region in which data is not transmitted. When such regions are used for both the slice 0 and the slice X, an instantaneous transmission rate of the main memory 160 can be lowered. Thus, the power consumption can be reduced. In addition, the inner memory can be omitted.

The stream converter 106 generates a sync pulse with the video ES in the following order.

The stream converter 106 causes the signal level of the sync pulse to be high in the following manner.

if (the PES header is present) one clock pulse prior to the first 00 of the PES header
Else if (the sequence header is present)
one clock pulse prior to the first 00 of the sequence header
Else if (the GOP header is present)
one clock pulse prior to the first 00 of the GOP header
Else
one clock pulse prior to the first 00 of the picture header Thereafter, until the slice header (MB data) is detected, the stream converter 106 causes the signal level of the sync pulse to be low. Thus, the stream converter 106 does not add a sync pulse to the start code of the user data and so forth.

Next, with reference to FIGS. 22A, 22B, and 22C, the interface for transmitting data will be described in detail. FIG. 22A shows sync pulses. FIG. 22B shows a video ES received from the stream converter 106. In the example shown in FIG. 22B, with four intervals of sync pulses (544 clock pulses), data of the slice 0 is intermittently transmitted. Thereafter, other slices are successively transmitted from the slice 1.

FIG. 22C shows the contents of the slice 0 that tarts with a sequence header. The slice 0 is composed of a first data portion, a second data portion, and a third data portion. The first data portion is composed of sequence header ( ), sequence extension ( ), and extension and user data (0). The second data portion is composed of group of pictures header ( ) and extension and user data (1). The third data portion is composed of picture header ( ), picture coding extension ( ), and extension and user data (2). According to the embodiment of the present invention, sequence header ( ), group of pictures header ( ), and picture header ( ) are always added to each picture. The slice X (slice 1, slice 2, . . . ) is data of which slice ( ) is followed by macroblock ( ) extension and user data ( ) contains a video index (coded information inserted in a particular line in a vertical blanking interval), video ancillary data, a closed caption, a teletext, VITC (a time code recorded in a vertical blanking interval), LTC (a time code recorded in the longitudinal direction of the tape), and so forth.

The contents of each data and multiplexing method are defined in the MPEG syntax (ISO/IEC 13818-2). Next, a part of them will be described. FIG. 23 is a table showing the definition of the start code value. Individual start codes have bit patterns unique in the video ES. Each start code is composed of a two-byte predetermined bit sequence (0000 0000 0000 0000) followed by a start code value. For example, slice start code is (01 to AF); and sequence header code is (B3).

FIG. 24 shows the MPEG syntax (video sequence). In FIG. 24, sequence header ( ), sequence extension ( ), extension and user data ( ), group of pictures header ( ), picture header ( ), and picture coding extension ( ) are treated as the slice 0 (non-video data).

FIG. 25 shows the contents of sequence header. For example, horizontal size value (12 bits) represents the number of pixels of a picture in the horizontal direction bit rate value represents the bit rate. FIG. 26 shows the contents of group of pictures header time code represents the time period starting from the beginning of the sequence closed gop represents that a picture in the current GOP can be reproduced independently from another GOP. FIG. 27 shows the contents of picture header. For example, picture coding type represents the picture type full pel forward vector represents whether the accuracy of the moving vector is in the unit of an integer number of pixels or a half pixel.

It should be noted that the present invention can be applied to an MPEG1 stream as well as an MPEG2 stream. In addition, the present invention can be applied to the case that a PES of which one PES is one picture is recorded and/or reproduced. Moreover, the present invention can be applied to the case that a record medium other than a magnetic tape is used (for example, a magneto-optical disc or a phase change type disc).

According to the present invention, a stream corresponding to the MPEG standard can be recorded and/or reproduced. In addition, since an ES can be input and output, a recording and reproducing apparatus with a small delay can be structured. Since a device stream that is partly modified against the MPEG syntax is recorded and/or reproduced, the resistance against an error can be improved. In addition, the picture quality in the variable speed reproducing operation can be improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A video data recording apparatus for recording video data to a record medium, comprising:

receiving means for receiving an elementary stream from outside of the apparatus, the elementary stream containing video data encoded using a variable length code having a hierarchical structure of a block layer, a macro block layer, a slice layer, a picture layer, a GOP layer, and a sequence layer, the block layer being composed of variable length data of which one screen of video data is divided into a plurality of blocks, video data of each block is orthogonally transformed and thereby coefficient data is generated, the coefficient data being encoded with a variable length code, the macro block layer being composed of a plurality of blocks that are spatially adjacent, the slice layer being composed of at least one macro block, the picture layer being composed of at least one slice, the GOP layer being composed of at least one picture, the sequence layer being composed of at least one GOP;

recording side stream converting means for converting the elementary stream that is output from said receiving means such that each slice in the slice layer is composed of only a single macro block, thereby generating a device stream having a fixed bit rate suitable for the record medium;

record processing means for performing a process for recording the device stream to the record medium and forming record data; and recording means for recording the record data received from said record processing means to the record medium.

2. The video data recording apparatus as set forth in claim 1, further comprising: encoding means for generating the elementary stream with the video data and supplying the generated elementary stream to said receiving means.

3. The video data recording apparatus as set forth in claim 1, wherein said recording side stream converting means limits each slice to a maximum length of one (1) macro block.

4. The video data recording apparatus as set forth in claim 1, wherein said recording side stream converting means rearranges the coefficient data from the plurality of blocks such that the frequency components of the coefficient data are arranged from the lowest frequency component to the highest frequency component.

5. The video data recording apparatus as set forth in claim 1, wherein said recording side stream converting means combines data from headers in different layers of the elementary stream into a zero (0) slice in the device stream.

6. The video data recording apparatus as set forth in claim 1, wherein user data in the elementary stream is combined with data from headers in different layers of the elementary stream into a zero (0) slice in the device stream.

7. A video data recording and reproducing apparatus for recording video data to a record medium and reproducing video data from the record medium, comprising:

receiving means for receiving an elementary stream from outside of the apparatus, the elementary stream containing video data encoded using a variable length code having a hierarchical structure of a block layer, a macro block layer, a slice layer, a picture layer, a GOP layer, and a sequence layer, the block layer being composed of variable length data of which one screen of video data is divided into a plurality of blocks, video data of each block is orthogonally transformed and thereby coefficient data is generated, the coefficient data being encoded with a variable length code, the macro block layer being composed of a plurality of blocks that are spatially adjacent, the slice layer being composed of at least one macro block, the picture layer being composed of at least one slice, the GOP layer being composed of at least one picture, the sequence layer being composed of at least one GOP;

recording side stream converting means for converting the elementary stream that is output from said receiving means such that each slice in the slice layer is composed of only a single macro block, thereby generating a device stream having a fixed bit rate suitable for the record medium;

record processing means for performing a process for recording the device stream to the record medium and forming record data;

recording means for recording the record data received from said record processing means to the record medium; reproducing means for reproducing the record data from the record medium;

reproduction processing means for processing the record data that is output from said reproducing means and restoring the device stream;

reproducing side stream converting means for converting the restored device stream to the elementary stream; and transmitting means for outputting the elementary stream that is output from said reproducing side stream converting means to the outside of the apparatus.

8. The video data recording and reproducing apparatus as set forth in claim 7, further comprising: encoding means for generating the elementary stream with the video data and supplying the generated elementary stream to said receiving means.

9. The video data recording and reproducing apparatus as set forth in claim 7, wherein said recording side stream converting means limits each slice to a maximum length of one (1) macro block.

10. The video data recording and reproducing apparatus apparatus as set forth in claim 7, wherein said recording side stream converting means rearranges the coefficient data from the plurality of blocks such that the frequency components of the coefficient data are arranged from the lowest frequency component to the highest frequency component.

11. The video data recording and reproducing apparatus as set forth in claim 7, wherein said recording side stream converting means combines data from headers in different layers of the elementary stream into a zero (0) slice in the device stream.

12. The video data recording and reproducing apparatus as set forth in claim 7, wherein user data in the elementary stream is combined with data from headers in different layers of the elementary stream into a zero (0) slice in the device stream.

13. The video data recording and reproducing apparatus as set forth in claim 7, further comprising: decoding means for generating the video data with the elementary stream.

14. The video data recording and reproducing apparatus as set forth in claim 7, further comprising: decoding means for generating the video data with the elementary stream that is output from said transmitting means.

15. A video data recording method for recording video data to a record medium, comprising the steps of:

(a) receiving an elementary stream from outside of the apparatus, the elementary stream containing video data encoded using a variable length code having a hierarchical structure of a block layer, a macro block layer, a slice layer, a picture layer, a GOP layer, and a sequence layer, the block layer being composed of variable length data of which one screen of video data is divided into a plurality of blocks, video data of each block is orthogonally transformed and thereby coefficient data is generated, the coefficient data being encoded with a variable length code, the macro block layer being composed of a plurality of blocks that are spatially adjacent, the slice layer being composed of at least one macro block, the picture layer being composed of at least one slice, the GOP layer being composed of at least one picture, the sequence layer being composed of at least one GOP;

(b) converting the elementary stream obtained at step (a) such that each slice in the slice layer is composed of only a single macro block, thereby generating a device stream having a fixed bit rate suitable for the record medium;

(c) performing a process for recording the device stream to the record medium and forming record data; and (d) recording the record obtained at step (c) to the record medium.

16. A video data recording and reproducing method for recording video data to a record medium and reproducing video data from the record medium, comprising the steps of:

(a) receiving an elementary stream from outside of the apparatus, the elementary stream containing video data encoded using a variable length code having a hierarchical structure of a block layer, a macro block layer, a slice layer, a picture layer, a GOP layer, and a sequence layer, the block layer being composed of variable length data of which one screen of video data is divided into a plurality of blocks, video data of each block is orthogonally transformed and thereby coefficient data is generated, the coefficient data being encoded with a variable length code, the macro block layer being composed of a plurality of blocks that are spatially adjacent, the slice layer being composed of at least one macro block, the picture layer being composed of at least one slice, the GOP layer being composed of at least one picture, the sequence layer being composed of at least one GOP;

(b) converting the elementary stream obtained at step (a) such that each slice in the slice layer is composed of only a single macro block, thereby generating a device stream having a fixed bit rate suitable for the record medium;

(c) performing a process for recording the device stream to the record medium and forming record data;

(d) recording the record data obtained at step (c) to the record medium;

(e) reproducing the record data from the record medium;

(f) processing the record data obtained at step (e) and restoring the device stream;

(g) converting the restored device stream to the elementary stream; and (h) outputting the elementary stream obtained at step (g) to the outside.

* * * * *